(12) United States Patent
Shin et al.

(10) Patent No.: US 10,652,680 B2
(45) Date of Patent: May 12, 2020

(54) ELECTRONIC DEVICE AND METHOD FOR CONTROLLING INPUT AND OUTPUT BY ELECTRONIC DEVICE

(71) Applicant: Samsung Electronics Co., Ltd., Suwon-si, Gyeonggi-do (KR)

(72) Inventors: Sang-Wook Shin, Seoul (KR); Sung-Woon Jang, Hwaseong-si (KR); Sang-Ki Kang, Suwon-si (KR); Sung-Wan Youn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 15/094,425

(22) Filed: Apr. 8, 2016

(65) Prior Publication Data
US 2016/0360332 A1  Dec. 8, 2016

(30) Foreign Application Priority Data
Jun. 4, 2015  (KR) .......................... 10-2015-0079324

(51) Int. Cl.
*H04R 29/00* (2006.01)
*H04M 1/60* (2006.01)
(Continued)

(52) U.S. Cl.
CPC ............ *H04R 29/004* (2013.01); *H04M 1/60* (2013.01); *H04L 12/1813* (2013.01);
(Continued)

(58) Field of Classification Search
CPC ..... H04M 3/568; H04M 3/56; H04L 12/1827; H04L 12/1813; H04R 2410/00;
(Continued)

(56) References Cited

U.S. PATENT DOCUMENTS

| 4,543,665 A * | 9/1985 | Sotelo ................... H04M 1/737 |
| | | 379/56.3 |
| 2003/0104842 A1* | 6/2003 | Choi ....................... H04M 1/05 |
| | | 455/569.1 |

(Continued)

FOREIGN PATENT DOCUMENTS

| EP | 1199867 A1 * | 4/2002 | .......... H04M 1/6058 |
| KR | 10-2005-0076262 A | 7/2005 | |

(Continued)

OTHER PUBLICATIONS

Microsoft, Select different devices for audio and microphone, Aug. 4, 2016.*

(Continued)

*Primary Examiner* — Davetta W Goins
*Assistant Examiner* — Kuassi A Ganmavo
(74) *Attorney, Agent, or Firm* — Jefferson IP Law, LLP

(57) ABSTRACT

An electronic device is provided. The electronic device includes a first speaker, a first microphone, a storage unit storing a reference signal, and a controller configured to, when the reference signal is output through the first speaker, receive a first signal input through the first microphone and a second signal input through a second microphone of an external electronic device and determine whether to use the first microphone or the second microphone based on at least one of the first signal input through the first microphone and the second signal input through the second microphone.

17 Claims, 19 Drawing Sheets

(51) Int. Cl.
  *H04M 3/56* (2006.01)
  *H04R 3/00* (2006.01)
  *H04L 12/18* (2006.01)
  *H04R 27/00* (2006.01)
(52) U.S. Cl.
  CPC .......... *H04L 12/1827* (2013.01); *H04M 3/56* (2013.01); *H04M 3/568* (2013.01); *H04R 3/005* (2013.01); *H04R 27/00* (2013.01); *H04R 29/008* (2013.01); *H04R 2410/00* (2013.01); *H04R 2420/07* (2013.01)
(58) Field of Classification Search
  CPC .......... H04R 27/00; H04R 3/00; H04R 3/005; H04R 29/004; H04R 5/04
  See application file for complete search history.

(56) References Cited

U.S. PATENT DOCUMENTS

| | | | | |
|---|---|---|---|---|
| 2007/0087686 | A1* | 4/2007 | Holm | H04S 7/30 455/3.06 |
| 2007/0112563 | A1* | 5/2007 | Krantz | G10L 25/69 704/216 |
| 2007/0139513 | A1* | 6/2007 | Fang | H04N 7/142 348/14.01 |
| 2008/0157998 | A1* | 7/2008 | Zuo | H04M 1/2535 340/4.37 |
| 2008/0274770 | A1* | 11/2008 | Park | H04M 1/6016 455/557 |
| 2009/0003620 | A1* | 1/2009 | McKillop | G06F 3/165 381/80 |
| 2009/0023479 | A1* | 1/2009 | Hulvey | H04M 1/6066 455/569.1 |
| 2009/0156123 | A1* | 6/2009 | Kim | H04M 1/7253 455/41.2 |
| 2009/0238377 | A1* | 9/2009 | Ramakrishnan | G10L 21/028 381/92 |
| 2011/0045812 | A1* | 2/2011 | Kim | G06F 1/1626 455/418 |
| 2011/0064232 | A1* | 3/2011 | Ruwisch | H04M 1/24 381/59 |
| 2011/0117842 | A1* | 5/2011 | Hong | H04M 1/7253 455/41.2 |
| 2012/0058754 | A1* | 3/2012 | Couse | H04M 1/7253 455/416 |
| 2012/0290305 | A1* | 11/2012 | Feng | G10L 19/002 704/500 |
| 2012/0300958 | A1* | 11/2012 | Klemmensen | H04R 25/43 381/81 |
| 2013/0022216 | A1* | 1/2013 | Ganong, III | H04M 3/569 381/92 |
| 2013/0226593 | A1* | 8/2013 | Magnusson | H04N 5/765 704/276 |
| 2013/0283164 | A1* | 10/2013 | Mahalingam | G06F 13/12 715/727 |
| 2014/0056439 | A1* | 2/2014 | Kim | H04R 3/00 381/92 |
| 2014/0069261 | A1* | 3/2014 | Tsai | G10H 1/361 84/610 |
| 2014/0122090 | A1* | 5/2014 | Park | G06F 3/167 704/275 |
| 2015/0117671 | A1* | 4/2015 | Chen | H04L 12/1813 381/92 |
| 2015/0296294 | A1* | 10/2015 | Paquier | G10L 21/0216 381/71.1 |
| 2015/0359015 | A1* | 12/2015 | Hrabak | H04W 4/80 709/227 |
| 2016/0004499 | A1* | 1/2016 | Kim | G06F 3/04847 715/716 |

FOREIGN PATENT DOCUMENTS

| | | |
|---|---|---|
| KR | 10-2008-0063548 A | 7/2008 |
| KR | 10-2010-0034288 A | 4/2010 |
| KR | 10-2015-0012495 A | 2/2015 |

OTHER PUBLICATIONS

Fenfred, Is there an easy way to switch between bluetooth speaker and builtin speaker, Microsoft, 2012.*
Kessler, How to quickly change audio output in OS X, CNET, 2013.*

* cited by examiner

ELECTRONIC DEVICE AND METHOD FOR CONTROLLING INPUT AND OUTPUT BY ELECTRONIC DEVICE

CROSS-REFERENCE TO RELATED APPLICATION(S)

This application claims the benefit under 35 U.S.C. § 119(a) of a Korean patent application filed on Jun. 4, 2015 in the Korean Intellectual Property Office and assigned Serial No. 10-2015-0079324, the entire disclosure of which is hereby incorporated by reference.

TECHNICAL FIELD

The present disclosure relates to electronic devices and methods for controlling input and output by electronic devices.

BACKGROUND

Generally, the term "electronic device" denotes a device for performing a particular function by its equipped program, such as a home appliance, an electronic scheduler, a portable multimedia player, a mobile communication terminal, a tablet personal computer (PC), a video/sound device, a desktop PC or laptop computer, a navigation for automobile, etc. For example, electronic devices may output stored information as voices or images. As electronic devices are highly integrated, and high-speed, high-volume wireless communication becomes commonplace, mobile communication terminals are recently being equipped with various additional functions.

For example, an electronic device comes with the integrated functionality, including an entertainment function, such as playing video games, a multimedia function, such as replaying music/videos, a communication and security function for mobile banking, a scheduling or e-wallet function, etc.

Further, for example, an electronic device may be connected with at least one other electronic device via wired or wireless communication and the electronic devices connected via communication may interwork with one another to perform functions.

Further, an electronic device comes with various functionalities. As necessary, one electronic device may have a plurality of microphones or a plurality of speakers.

According to a technology of the related art, e.g., although a user uses multiple electronic devices together, the user uses the microphone and speaker in the same electronic device when he needs to use the microphone or speaker, e.g., for calling. Thus, such technology might not provide the optimal performance.

For example, during a voice call, the opposite party's audio signal (e.g., voice) output through the speaker of a particular electronic device may be introduced into the microphone of the same electronic device, causing undesired echoes. To remove such echoes, the electronic device may need additional signal processing, which may cause a distortion of the user's voice or a lowering in the signal level.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for controlling input and output by the electronic device, allowing the user to selectively use the microphone or speaker through different electronic devices for performing a particular function or application when the user uses a plurality of electronic devices.

Another aspect of the present disclosure is to provide an electronic device and method for controlling input and output by the electronic device, allowing a particular microphone or speaker to be selectively used for performing an application or function in an electronic device having a plurality of mobile communications or a plurality of speakers when the electronic device is in use.

In accordance with an aspect of the present disclosure, an electronic device is provided. The electronic device includes a housing, a speaker exposed through an outer surface of the housing, a first microphone exposed through the outer surface of the housing, a processor electrically connected with the speaker and the first microphone, and a memory electrically connected with the processor, wherein the memory includes instructions to enable the processor to receive a first sound through the first microphone during a first period of an output through the speaker, receive a signal indicating a result of receiving the first sound during at least a portion of the first period by a second microphone of an external electronic device, select at least one of the first microphone and the second microphone based on at least a portion of the signal and a result of the reception during the first period, receive a second sound during a second period after the first period using one of the selected first microphone or second microphone, and disable the other of the first microphone or the second microphone.

In accordance with another aspect of the present disclosure, an electronic device is provided. The electronic device includes a housing, a speaker exposed through an outer surface of the housing, a first microphone exposed through the outer surface of the housing and second microphone exposed through the outer surface of the housing, a processor electrically connected with the first microphone and the second microphone, and a memory electrically connected with the processor, wherein the memory includes instructions to enable the processor to receive a first sound through the first microphone during a first period of an output through the speaker to generate a first signal, receive the first signal through the second microphone during at least a portion of the first period to generate a second signal, select at least one of the first microphone and the second microphone based on at least a portion of the first signal and the second signal, receive a second sound during a second period after the first period using one of the selected first microphone or second microphone, and disable the other of the first microphone or the second microphone.

In accordance with another aspect of the present disclosure, an electronic device is provided. The electronic device includes a communication module, a processor electrically connected with the communication module, and a memory electrically connected with the processor, wherein the memory includes instructions to enable the processor to receive, from a first external electronic device, a first signal indicating a result of receiving a first sound by a first microphone of the first external electronic device during a first period of an output through a speaker included in at least one of the first external electronic device, a second external electronic device, or a third external electronic device, receive, from the second external electronic device, a second signal indicating a result of receiving the first sound during at least a portion of the first period by a second microphone of the second external electronic device, select at least one of the first microphone and the second microphone based on at least a portion of the first signal and the second signal, receive a second sound during a second period after the first period using the selected first microphone or second microphone, and disable the other of the first microphone or the second microphone.

In accordance with another aspect of the present disclosure, an electronic device in provided. The electronic device includes a first speaker, a first microphone, a storage unit configured to store a reference signal, and a controller configured to, when the reference signal is output through the first speaker, receive a first signal input through the first microphone and a second signal input through a second microphone of an external electronic device and determine whether to use the first microphone or the second microphone based on at least one of the first signal input through the first microphone and the second signal input through the second microphone.

In accordance with another aspect of the present disclosure, a method for controlling input and output by an electronic device is provided. The method includes generating a reference signal, outputting the generated reference signal through a first speaker provided in the electronic device, receiving a first signal input through a first microphone provided in the electronic device, receiving a second signal input through a second microphone provided in an external electronic device, and determining whether to use the first microphone or the second microphone based on at least one of the first signal input through the first microphone and the second signal input through the second microphone.

By an electronic device and method for controlling input and output according to an embodiment of the present disclosure, the user may selectively use the microphone or speaker in different electronic devices to run a particular application or perform a particular function when the user uses a plurality of electronic devices, addressing issues that may arise when the microphone and speaker in one electronic device are simultaneously used.

For example, when the user that is simultaneously using a wearable device and a smartphone performs a calling function, the opposite party's voice may be output through the speaker of the smartphone, and the user's voice may be input through the microphone of the wearable device.

As another example, when the user in the living room with a television (TV) performs a calling function using his smartphone, the opposite party's voice may be output through the speaker of the TV, and the user's voice may be input through the microphone of the smartphone.

An electronic device and method for controlling input and output according to an embodiment of the present disclosure may block noise caused when in one electronic device the microphone and the speaker are simultaneously used, allowing for an echo canceling effect. Further, echoes input to the microphone may be effectively removed even without additional hardware or software components.

When an electronic device and method for controlling input and output according to an embodiment of the present disclosure are applied to a voice recognition engine, a voice recognition rate may be raised by such echo canceling effect.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
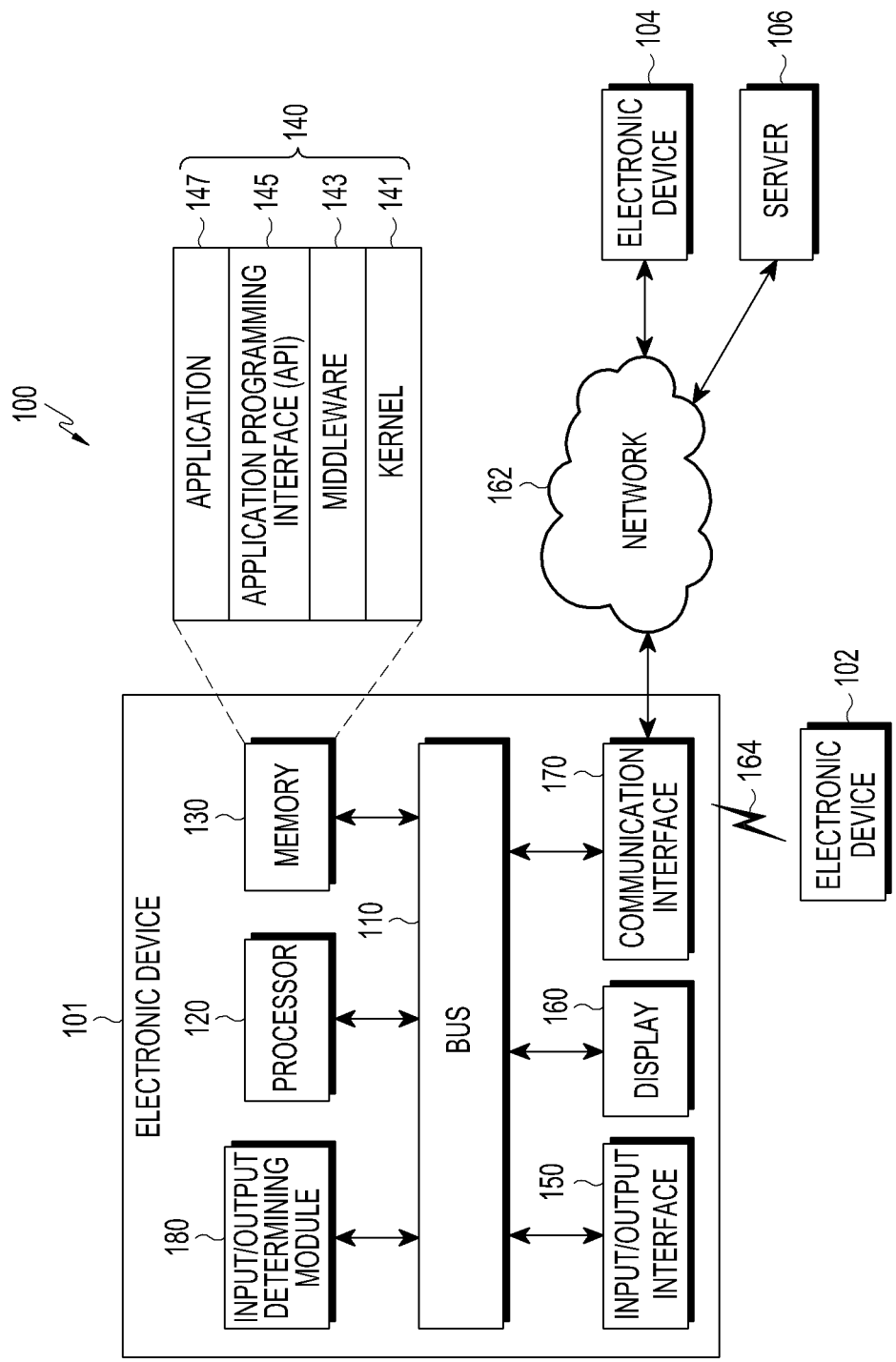
FIG. 1 is a view illustrating a network configuration according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group (MPEG-1 or MPEG-2) audio layer 3 (MP3) player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things (IOT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating a network configuration according to an embodiment of the present disclosure.

Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an input/output determining module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processor 120 may include one or more of a CPU, an AP, or a communication processor (CP). The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 is a device that may display information (e.g., those shown in FIGS. 13 and 14) related to the selection of a microphone or speaker according to an embodiment of the present disclosure, and the display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with a network 162 through wireless or wired communication to communicate with the external electronic device. For example, the communication interface 170 may directly communicate (164) with the external device (e.g., the first external electronic device 102) via wired or wireless communication. In the following embodiments, when the electronic device 101 is a smartphone, the first external electronic device 102 may be a wearable device. For example, according to an embodiment of the present disclosure, the smartphone and the wearable device may communicate with each other to communicate information for selecting a microphone or speaker.

The wireless communication may use at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present disclosure.

The server 106 may support to drive the electronic device 101 by performing at least one of various operations (or functions) implemented on the electronic device 101. For example, the server 106 may include an input/output determining server module (not shown) that may support the input/output determining module 180 implemented in the electronic device 101. For example, the determining server module may include at least one of the components of the input/output determining module 180 and perform (or instead perform) at least one of the operations (or functions) conducted by the input/output determining module 180.

The input/output determining module 180 may process at least part of information obtained from other elements (e.g., the processor 120, the memory 130, the input/output interface 150, or the communication interface 170) and may provide the same to the user in various manners.

For example, according to an embodiment of the present disclosure, the input/output determining module 180 may generate a reference signal and output the reference signal through at least one speaker (not shown) and may determine a speaker or microphone for use by analyzing a signal input through at least one microphone (not shown) when the reference signal is output through the speaker. The reference signal may be generated by referring to information previously stored in the memory 130.

Further, as another example, according to an embodiment of the present disclosure, the input/output determining module 180 may determine an application or function being currently run or to be run and may determine a speaker or microphone for use from among a plurality of available speakers or microphones by analyzing various user environments (e.g., the position of user, time, whether the user moves, the degree (e.g., magnitude, location, etc.) of ambient noise, or ambient brightness). Additional information on the input/output determining module 180 is provided through FIGS. 2 to 5 described below.

Although in FIG. 1 the input/output determining module 180 is shown to be a module separate from the processor 120, at least a portion of the input/output determining module 180 may be included or implemented in the processor 120 or at least one other module, or the overall function of the input/output determining module 180 may be included or implemented in the processor 120 shown or another processor.

Figure 2:
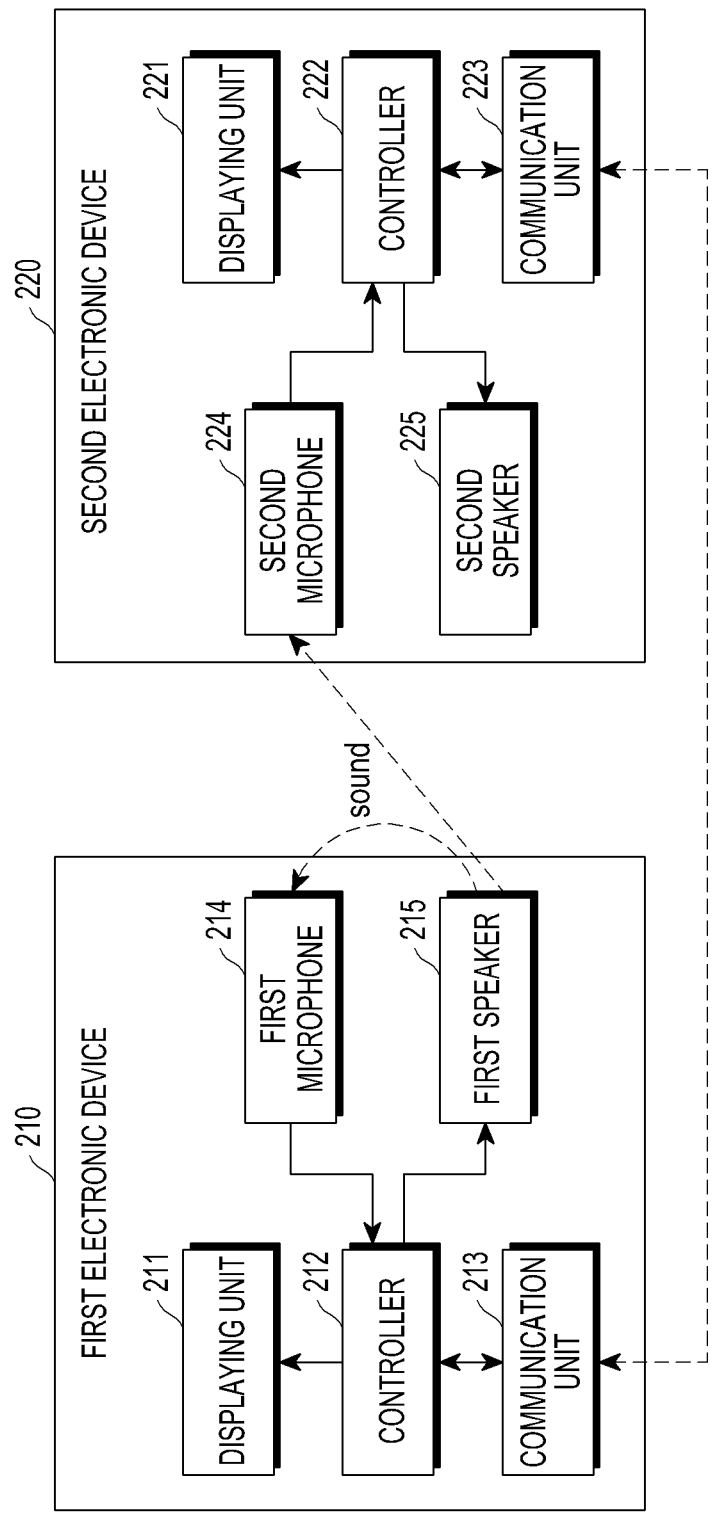
FIG. 2 is a view illustrating communication between electronic devices according to an embodiment of the present disclosure.

FIG. 2 is a view illustrating communication between electronic devices according to an embodiment of the present disclosure.

Referring to FIG. 2, according to an embodiment of the present disclosure, it may be possible to determine a microphone or speaker to be used through communication between the electronic devices.

For example, a first electronic device 210 may include at least one of a displaying unit 211, a controller 212, a communication unit 213, a first microphone 214, or a first speaker 215. Further, for example, a second electronic device 220 may include at least one of a displaying unit 221, a controller 222, a communication unit 223, a second microphone 224, or a second speaker 225.

According to an embodiment of the present disclosure, the controller 212 of the first electronic device 210 may output a reference signal through the first speaker 215. The reference signal may be a preset signal. Further, the reference signal may be a signal within a preset frequency band or a signal corresponding to the whole frequency band. For example, the reference signal may be a white noise, may be output for a preset time, or the same reference signal or different reference signals may be sequentially output at predetermined time intervals. Further, for example, a reference signal output through the first speaker 215 may be a signal within an audible frequency band (e.g., 20 Hz to 20,000 Hz) or a signal at least a portion of which departs from the audible frequency band.

Further, the reference signal may be a signal output through the first speaker or may be the voice of a user that is input through the microphone.

A signal output through the first speaker 215 may be input to the first microphone 214 of the first electronic device 210. Further, a signal output through the first speaker 215 may be input through the second microphone 224 of the second electronic device 220. The second electronic device 220 may also be denoted an external electronic device of the first electronic device 210.

According to an embodiment of the present disclosure, a signal input through the second microphone 224 of the second electronic device 220 may be transmitted through the communication unit 223 to the first electronic device 210 under the control of the controller 222. The controller 222 may perform analog signal processing and/or digital signal processing on the signal input through the second microphone 224 and transmit the same to the first electronic device 210. The first electronic device 210 may receive the signal transmitted from the second electronic device 220 through the communication unit 213.

The controller 212 of the first electronic device 210 may determine whether to use the first microphone 214 or the second microphone 224 based on the signal input through the first microphone 214 and the signal received from the second electronic device 220 (e.g., the signal transmitted based on the signal input through the second microphone 224). For example, the controller 212 may perform control to use any one, both, or neither of the first microphone 214 and the second microphone 224.

Various methods may be implemented to perform control not to use any one of the microphones, and various embodiments of the present disclosure are not limited to a particular method. For example, when the first microphone 214 is controlled not to be used, the controller 212 may generate an instruction enabling the first microphone 214 to be disabled. As another example, the controller 212 may switch the signal output path or control a circuit connected to the first microphone 214 so that the output of a voice signal is not to be transmitted to the first microphone 214.

When it is determined which microphone is to output signals as described above, the result of the determination may be displayed through the displaying unit 211. For example, the result may be displayed on the screen in the form shown in FIG. 13 which is described below. Further, the information displayed on the displaying unit 211 of the first electronic device 210 may be transmitted through the communication unit 213 to the second electronic device 220 so that the result of the determination may be displayed on the displaying unit 221 of the second electronic device 220.

According to an embodiment of the present disclosure, the controller 212 of the first electronic device 210 may determine whether to use the first microphone 214 or the second microphone 224 by further referring to other information as well as the signal input through the first microphone 214 and the signal received from the second electronic device 220 (e.g., the signal transmitted based on the signal input through the second microphone 224). For example, a combination of a microphone or speaker to be used for running the application (e.g., a phone application, video playing application, or car routing navigation) or function (e.g., a function related to the use of speaker or function related to the use of microphone) further considering, e.g., the application or function currently running or to be run.

Further, according to an embodiment of the present disclosure, the controller 212 of the first electronic device 210 may determine whether to use the first microphone 214 or the second microphone 224 by further referring to other information as well as the signals or information. For example, the controller 212 may select a combination of the microphone or speaker to be used further considering, e.g., user environment information. According to an embodiment of the present disclosure, the user environment information may include the position of the user, time, whether the user moves, the degree of ambient noise, ambient brightness, etc. For example, a combination of the microphone or speaker to be used may be selected from among the microphones or speakers provided in the plurality of electronic devices 210 and 220 further considering, e.g., whether the user of the electronic device is currently on the move, when the electronic device is used, whether the user is in the house, whether the user is in the car, etc.

Further, according to an embodiment of the present disclosure, conditions available for determining the speaker or microphone may be represented as numerical values (e.g., the conditions may be represented as scores), and the combination of the speaker or microphone may be determined by the numerical values.

Further, according to an embodiment of the present disclosure, the controller 212 of the first electronic device 210 may further consider preset user information in relation to the use of the microphone or speaker. For example, when there is a microphone or speaker set to be used for a particular application or function by the user, the user information may be first considered to determine the microphone or speaker to be used.

Further, according to an embodiment of the present disclosure, the second speaker 225 of the second electronic device 220 may output the same or different reference signal from the reference signal output through the first speaker 215. The reference signal output through the second speaker 225 of the second electronic device 220 may be input through the first microphone 214 of the first electronic device 210 or the second microphone 224. For example, according to an embodiment of the present disclosure, the speaker or microphone to be used may be determined considering both the signal from the microphones (first microphone 214 and second microphone 224) having received the reference signal output from the first microphone 214 and the signal from the microphones (first microphone 214 and second microphone 224) having received the reference signal output from the second microphone 214.

Figure 3:
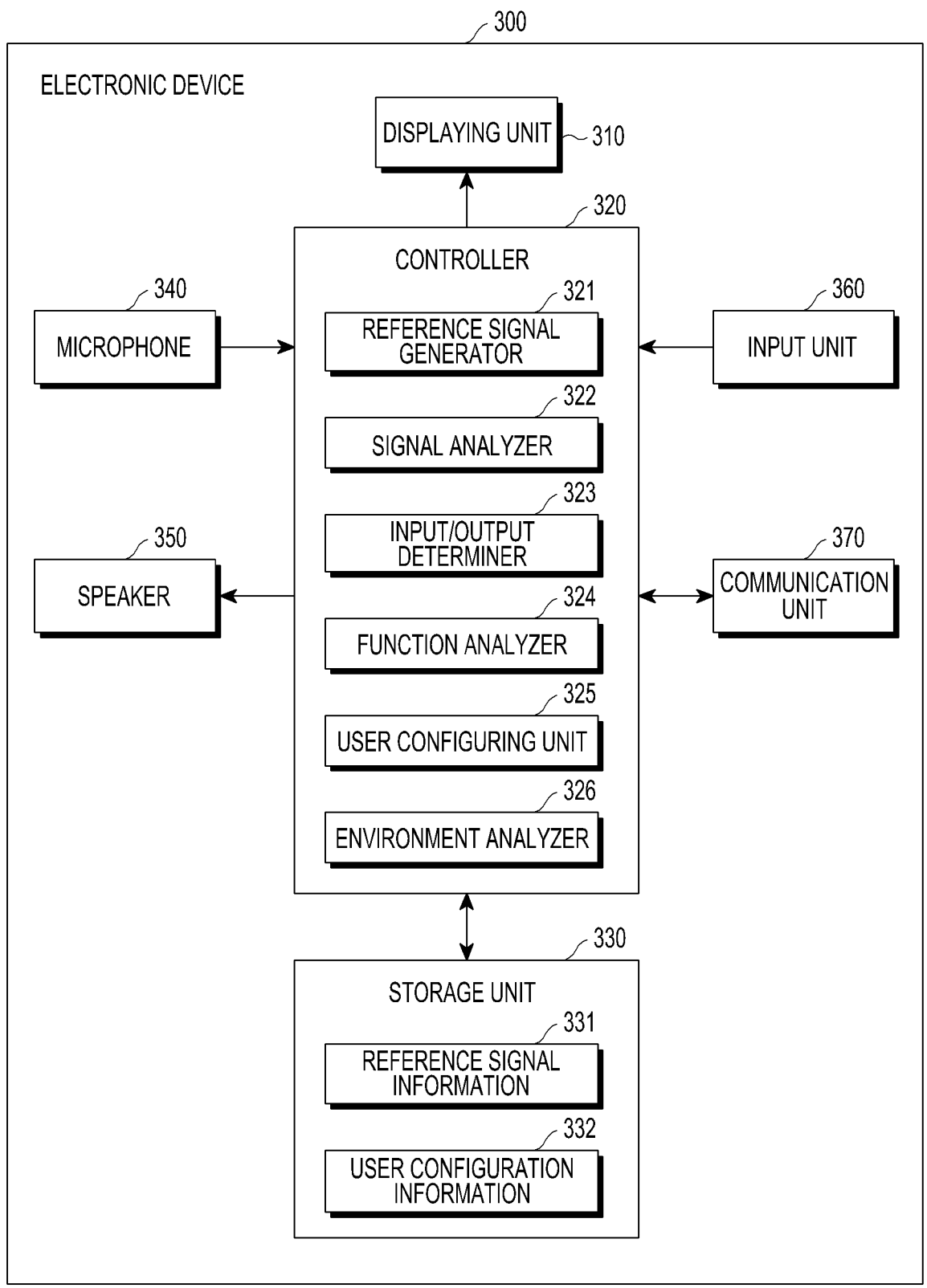
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, according to an embodiment of the present disclosure, an electronic device 300 may include at least one of a displaying unit 310, a controller 320, a storage unit 330, a microphone 340, a speaker 350, an input unit 360, or a communication unit 370. According to an embodiment of the present disclosure, the controller 320 may include at least one of a reference signal generator 321, a signal analyzer 322, an input/output determining unit 323, a function analyzer 324, a user configuring unit 325, or an environment analyzer 326.

All or some of the functions of the components of the electronic device 300 shown in FIG. 3 may be included in at least one component of FIG. 1. For example, at least a portion of the controller 320 may be included in the input/output determining module 180 or the processor 120 of FIG. 1. At least a portion of the storage unit 330 may be included in the memory 130 of FIG. 1, and at least a portion of the displaying unit 310 may be included in the display 160 of FIG. 1. At least a portion of the communication unit 370 may be included in the communication interface 170 of FIG. 1.

According to an embodiment of the present disclosure, the reference signal generator 321 of the controller 320 may generate a reference signal by identifying reference signal information 331 stored in the storage unit 330. The reference signal generated from the reference signal generator 321 may be output through the speaker 350. The reference signal may be a preset signal as described above. Further, the reference signal may be a signal within a preset frequency band or a signal corresponding to the whole frequency band. For example, the reference signal may be a white noise, may be output for a preset time, or the same reference signal or different reference signals may be sequentially output at predetermined time intervals. Further, for example, a reference signal output through the first speaker 350 may be a signal within an audible frequency band (e.g., 20 Hz to 20,000 Hz) or a signal at least a portion of which departs from the audible frequency band. Further, the reference signal may be a signal directly input by the user, such as a voice spoken out by the user.

A signal output through the first speaker 350 may be input to the microphone 340 of the electronic device 300. Further, the signal output through the speaker 350 may be input to the microphone of an external electronic device connected via communication with the electronic device 300.

According to an embodiment of the present disclosure, the signal input through the microphone of the external electronic device may be transmitted to the electronic device 300. According to an embodiment of the present disclosure, the signal input through the microphone of the external electronic device may undergo analog signal processing and/or digital signal processing and may be then transmitted to the electronic device 300. The electronic device 300 may receive the signal transmitted from the external electronic device through the communication unit 370.

The signal analyzer 322 of the controller 320 may analyze the signal input through the microphone 340 and the signal received through the communication unit 370 from the external electronic device (e.g., the signal transmitted based on the signal input through the microphone provided in the external electronic device). According to an embodiment of the present disclosure, the signal analyzer 322 may analyze the difference between the reference signal output through the speaker 350 and the signal input through the microphone 340 and may analyze the difference between the reference signal output through the speaker 350 and the signal received through the communication unit 370. The signal analyzer 322 may analyze each of the signal input through the microphone 340 or the signal received through the communication unit 370. Further, the signal analyzer 322 may analyze the signal, which is not output through the speaker 350 but externally generated and input through the microphone 340 (e.g., a signal obtained by the user's speak-out).

Various analog signal processing and/or digital signal processing methods may apply as the signal analysis by the signal analyzer 322. Further, the signal analyzer 322 may analyze the signals by calculating the time difference between reference signal and received signal, a time delay, or a transfer function.

The input/output determining unit 323 may determine (or select) an input means (e.g., microphone) or output means (e.g., speaker) based on the result of the analysis by the signal analyzer 322. In a specific example, the input/output determining unit 323 may compare the result of analyzing the signal input through the microphone 340 with the result of analyzing the signal received through the communication unit 370 to determine whether to use the microphone 340 of the electronic device 300 or a microphone of an external electronic device. The result of the determination may be displayed on the screen through the displaying unit 310.

The function analyzer 324 may analyze the application or function being currently run or to be run. For example, when requested to run a phone application by the user or when receiving a call from the opposite party, according to an embodiment of the present disclosure, which microphone or speaker is to be used for the application may be determined through the input/output determining unit 323. For example, the function analyzer 324 may determine that the application currently requested to be run is the phone application.

Further, according to an embodiment of the present disclosure, the function analyzer 324 may determine whether the application being currently run or requested to be run is the application or function needing the use of the microphone 340 or the speaker 350. For example, when the application being run or requested to be run is an application related to playing multimedia or an application for navigation, the function analyzer 324 may determine that the application is the application needing the use of the microphone 340 and/or the speaker 350.

According to an embodiment of the present disclosure, the input/output determining unit 323 may further consider the result of the analysis by the function analyzer 324 for input/output determination (e.g., determination as to the microphone or speaker to be used) as described above.

The user configuring unit 325 may perform a function of setting the microphone or speaker to be used corresponding to each application or function through the input unit 360. The result of the setting may be stored as user configuration information 332 in the storage unit 330. The user configuring unit 325 may provide a function of modifying or varying the user configuration information 332 stored in the storage unit 330. Further, the information configured through the user configuring unit 325 may be displayed on the screen through the displaying unit 310.

The input/output determining unit 323 may first consider the configuration information of the user configuring unit 325 when determining input/output (e.g., determination as to the microphone or speaker to be used) as described above, thereby to determine the microphone or speaker to be used.

The environment analyzer 326 may collect information related to various preset user environments or analyze the user environment through the collected information. For example, the environment analyzer 326 may analyze the position of user, time, whether the user moves, the degree of ambient noise, and ambient brightness. For example, the environment analyzer 326 may analyze whether the user of the electronic device is currently on the move, the time of the use, whether the user is in the house, or whether the user is in the car.

According to an embodiment of the present disclosure, the input/output determining unit 323 may further consider the result of the analysis by the environment analyzer 326 for the above-described input/output determination (e.g., determination as to the microphone or speaker to be used).

For example, according to an embodiment of the present disclosure, the input/output determining unit 323 may determine the microphone or speaker to be used based on at least one of the pieces of information provided from the signal analyzer 322, the function analyzer 324, the user configuring unit 325, or the environment analyzer 326. Further, the input/output determining unit 323 may determine the microphone or speaker to be used by assigning priority or weight to at least one of the pieces of information provided.

Further, according to an embodiment of the present disclosure, the input/output determining unit 323 may be implemented in an external server connected via communication through the communication unit 370. Accordingly, information determined by at least one of the signal analyzer 322, the function analyzer 324, the user configuring unit 325, and the environment analyzer 326 may be transmitted to the server through the communication unit 370. The server may determine the microphone or speaker for use based on the information transmitted through the communication unit 370 of the electronic device 300. The determined result may be provided from the server to the electronic device 300 or the external electronic device.

According to an embodiment of the present disclosure, an electronic device comprises a housing, a speaker exposed through an outer surface of the housing, a first microphone exposed through the outer surface of the housing, a processor electrically connected with the speaker and the first microphone, and a memory electrically connected with the processor, wherein the memory includes instructions to enable the processor to receive a first sound through the microphone during a first period of an output through the speaker, receive a signal indicating a result of receiving the first sound during at least a portion of the first period by a second microphone of an external electronic device, select at least one of the first microphone and the second microphone based on at least a portion of the signal and a result of the reception during the first period, receive a second sound during a second period after the first period using one of the selected first microphone or second microphone, and disable the other of the first microphone or the second microphone.

According to an embodiment of the present disclosure, the memory further includes an instruction to send a request for receiving the sound by the second microphone included in the external electronic device to the external electronic device.

According to an embodiment of the present disclosure, the at least one of the first microphone and the second microphone is selected based on at least one of context information, an action being performed by the electronic device, or a combination selected by a user.

According to an embodiment of the present disclosure, the context information includes at least one of a position of the user, a time, whether the user moves, a degree (e.g., magnitude, location, etc.) of ambient noise, an ambient brightness, etc.

According to an embodiment of the present disclosure, the electronic device further comprises a communication unit for receiving a signal inputted from the external electronic device through the second microphone.

According to an embodiment of the present disclosure, the memory further includes an instruction to identify whether a microphone or a speaker provided in at least one external electronic device connected with the electronic device via communication is available.

According to an embodiment of the present disclosure, the memory further includes an instruction to output a reference signal through the speaker.

According to an embodiment of the present disclosure, the reference signal includes a white noise signal or a voice signal of the user.

According to an embodiment of the present disclosure, an electronic device comprises a housing, a speaker exposed through an outer surface of the housing, a first microphone exposed through an outer surface of the housing and second microphone exposed through the outer surface of the housing, a processor electrically connected with the first microphone and the second microphone, and a memory electrically connected with the processor, wherein the memory includes instructions to enable the processor to receive a first sound through the first microphone during a first period of an output through the speaker to generate a first signal, receive the first signal through the second microphone during at least a portion of the first period to generate a second signal, select at least one of the first microphone and the second microphone based on at least a portion of the first signal and the second signal, receive a second sound during a second period after the first period using of the selected first microphone or second microphone, and disable the other of the first microphone or the second microphone.

According to an embodiment of the present disclosure, an electronic device comprises a communication module, a processor electrically connected with the communication module, and a memory electrically connected with the processor, wherein the memory includes instructions to enable the processor to receive, from a first external electronic device, a first signal indicating a result of receiving a first sound by a first microphone of the first external electronic device during a first period of an output through a speaker included in at least one of the first external electronic device, a second external electronic device, or a third external electronic device, receive, from the second external electronic device, a second signal indicating a result of receiving the first sound during at least a portion of the first period by a second microphone of the second external electronic device, select at least one of the first microphone and the second microphone based on at least a portion of the first signal and the second signal, receive a second sound during a second period after the first period using the selected first microphone or second microphone, and disable the other of the first microphone or the second microphone.

According to an embodiment of the present disclosure, an electronic device comprises a first speaker, a first microphone, a storage unit configured to store a reference signal, and a controller configured to, when the reference signal is output through the first speaker, receive a first signal input through the first microphone and a second signal input through a second microphone of an external electronic device and determine whether to use the first microphone or the second microphone based on at least one of the first signal input through the first microphone and the second signal input through the second microphone.

According to an embodiment of the present disclosure, the electronic device further comprises a communication unit configured to receive a signal inputted from the external electronic device through the second microphone.

According to an embodiment of the present disclosure, the controller is further configured to control to identify whether a microphone or a speaker provided in at least one external electronic device connected with the electronic device via communication is available.

According to an embodiment of the present disclosure, the controller is further configured to control to determine whether to use the first microphone or the second microphone based on the reference signal.

According to an embodiment of the present disclosure, the reference signal is a white noise signal or a voice signal of the user.

According to an embodiment of the present disclosure, the controller is further configured to control to determine whether to use the first microphone or the second microphone based on the user context information.

According to an embodiment of the present disclosure, the user context information may include at least one of a position of the user, a time, whether the user moves, a degree of ambient noise, an ambient brightness, etc.

According to an embodiment of the present disclosure, the controller is further configured to control to determine whether to use the first microphone or the second microphone based on information regarding an application to be run on the electronic device.

According to an embodiment of the present disclosure, the controller is further configured to control to determine whether to use the first microphone or the second microphone based on at least one function to be run on the electronic device.

According to an embodiment of the present disclosure, the controller is further configured to control to determine whether to use the first microphone or the second microphone based on user context information configured by a user.

Figure 4:
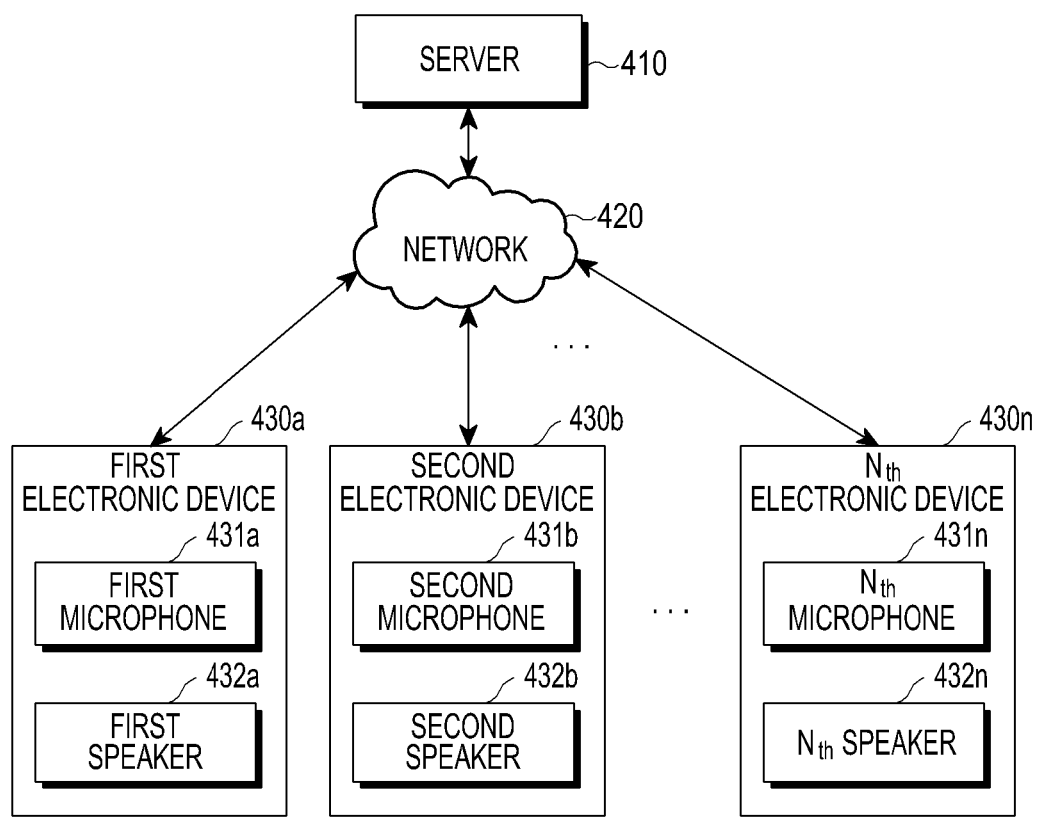
FIG. 4 is a view illustrating communication between electronic devices according to an embodiment of the present disclosure.

FIG. 4 is a view illustrating communication between electronic devices according to an embodiment of the present disclosure.

An example in which two electronic devices are connected according to an embodiment of the present disclosure has been described above in connection with FIG. 3. The same or similar example may also apply where three or more electronic devices are connected according to an embodiment of the present disclosure.

Referring to FIG. 4, a first electronic device 430*a*, a second electronic device 430*b*, . . . , a Nth electronic device 430*n* may be mutually connected via communication through a network 420. According to an embodiment of the present disclosure, each electronic device 430 may have a microphone 431 (e.g., 431*a*, 431*b* . . . 431*n*) or speaker 432 (e.g., 432*a*, 432*b* . . . 432*n*). Although FIG. 4 illustrates an example where each electronic device 430 includes both the microphone 431 and the speaker 432, the electronic device 430 may include any one of the microphone 431 or the speaker 432 according to an embodiment of the present disclosure. Further, any one of the plurality of electronic devices 430 may include a plurality of microphones or a plurality of speakers.

According to an embodiment of the present disclosure, the first electronic device 430*a* may identify electronic devices (e.g., the second electronic device 430*b* to the Nth electronic device 430*n*) connected via communication with the first electronic device 430*a*. Further, the first electronic device 430*a* may determine whether each electronic device connected via communication with the first electronic device 430*a* has a microphone or speaker.

When the first electronic device 430*a* is requested to run a particular application or function, and the requested application or function needs the use of a microphone or speaker, according to an embodiment of the present disclosure, the first electronic device 430*a* may determine which one of the microphones or speakers provided in the plurality of electronic devices (the first electronic device 430*a*, the second electronic device 430*b*, . . . , the Nth electronic device 430*n*) is to be used.

Various methods may be implemented to determine the microphone or speaker for use by the first electronic device 430*a*, and the methods described above in connection with FIGS. 2 and 3 may come in use.

For example, according to an embodiment of the present disclosure, when the first electronic device 430*a* outputs a reference signal through the first microphone 431*a*, the signal input through the first speaker 432*a* to the Nth speaker 432*n* may be analyzed. The speaker to be used for the application or function requested to be run may be determined from among the first speaker 432*a* to the Nth speaker 432*n* based on the result of the analysis.

Further, according to an embodiment of the present disclosure, after the reference signal is sequentially output from the first microphone 431*a* of the first electronic device 430*a* to the nth microphone 431*n* of the Nth electronic device 430*n*, the signal input through each speaker 432 may be analyzed to determine the speaker 432 or microphone 431 for use.

Further, according to an embodiment of the present disclosure, the determination of the microphone 431 or the speaker 432 for use may be implemented through a server 410. For example, the information input or analyzed from each electronic device 430 may be provided through the network 420 to the server 410, and the server 410 may determine the microphone 431 or speaker 432 for use based on the information transmitted from each electronic device 430.

The network 430 may include at least one of telecommunication networks, e.g., a computer network (e.g., LAN or WAN), Internet, or a telephone network. The network 330 may include a short-range communication network. For example, the network 430 may include a cellular network, a Wi-Fi network, or a Bluetooth (BT) network.

Figure 5:
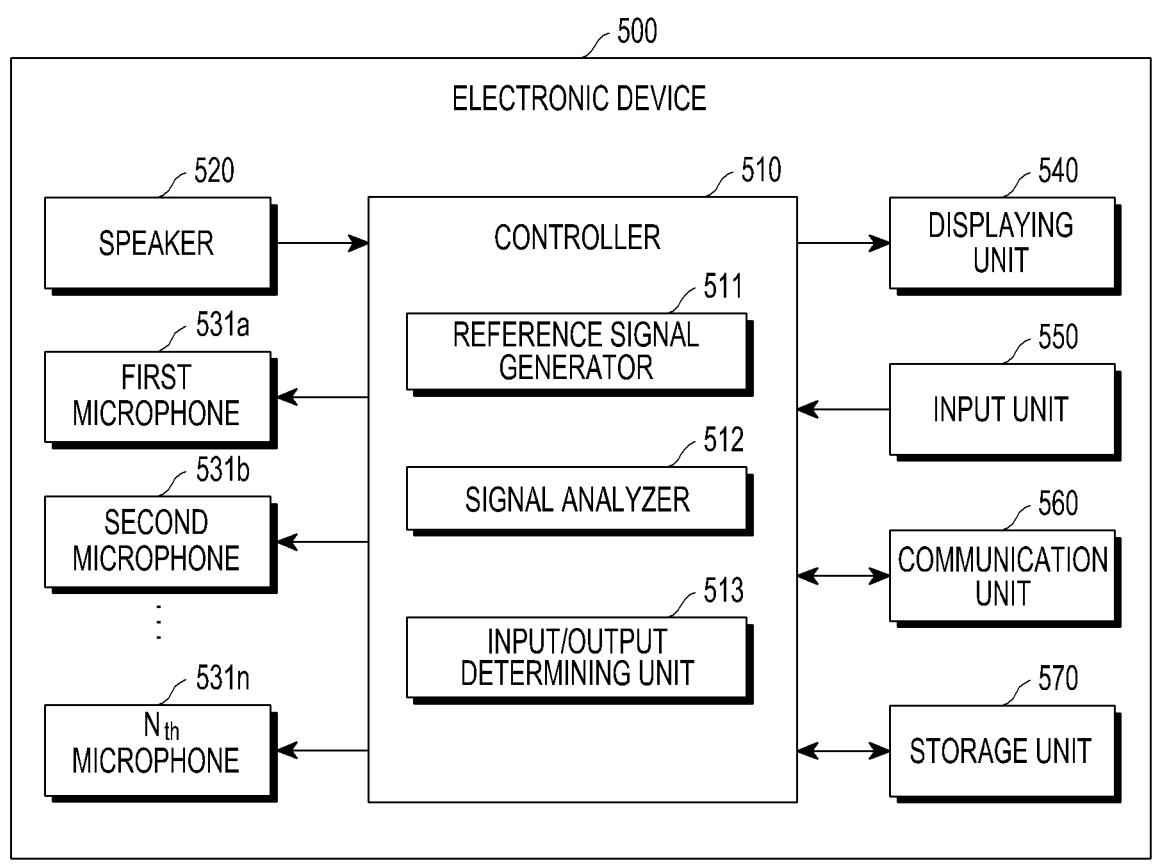
FIG. 5 is a block diagram illustrating a configuration of an electronic device according to an embodiment of the present disclosure.

FIG. 5 is a block diagram illustrating a configuration of an electronic device according to an embodiment of the present disclosure.

Referring to FIG. 5, according to an embodiment of the present disclosure, an electronic device 500 may include at least one of a controller 510, at least one speaker 520, at least one microphone 531*a* to 531*n*, a displaying unit 540, an input unit 550, a communication unit 560, or a storage unit 570. Further, according to an embodiment of the present disclosure, the controller 510 may include a reference signal generator 511, a signal analyzer 512, or an input/output determining unit 513.

All or some of the functions of the components of the electronic device 500 shown in FIG. 5 may be included in at least one component of FIG. 1. For example, at least a portion of the controller 510 may be included in the input/output determining module 180 or the processor 120 of FIG. 1. At least a portion of the storage unit 570 may be included in the memory 130 of FIG. 1, and at least a portion of the displaying unit 540 may be included in the display 160 of FIG. 1. At least a portion of the communication unit 560 may be included in the communication interface 170 of FIG. 1.

According to an embodiment of the present disclosure, the reference signal generator 511 of the controller 510 may generate a reference signal by identifying reference signal information stored in the storage unit 570. The reference signal generated from the reference signal generator 511 may be output through the speaker 520. The reference signal may be a preset signal as described above. Further, the reference signal may be a signal within a preset frequency band or a signal corresponding to the whole frequency band. For example, the reference signal may be a white noise, may be output for a preset time, or the same reference signal or different reference signals may be sequentially output at predetermined time intervals. Further, for example, a reference signal output through the speaker 520 may be a signal within an audible frequency band (e.g., 20 Hz to 20,000 Hz) or a signal at least a portion of which departs from the audible frequency band. Further, the reference signal may be a voice signal directly spoken out by the user.

The signal output through the speaker 520 may be input to a plurality of microphones 531*a* to 531*n* of the electronic device 500.

The signal analyzer 512 of the controller 510 may analyze the signal input through the plurality of microphones 531*a* to 531*n*. According to an embodiment of the present disclosure, the signal analyzer 512 may analyze the difference between the reference signal output through the speaker 520 and the signal input through the plurality of microphones 531*a* to 531*n*.

Various analog signal processing and/or digital signal processing methods may apply as the signal analysis by the signal analyzer 512. Further, the signal analyzer 512 may analyze a signal by calculating the time difference between the reference signal and the signal input through the plurality of microphones 531*a* to 531*n*, a transfer function, or time delay.

The input/output determining unit 513 may determine (or select) an input means (e.g., microphone) or output means (e.g., speaker) based on the result of the analysis by the signal analyzer 512. As a more specific example, the input/output determining unit 513 may determine which microphone of the plurality of microphones 531*a* to 531*n* is to be used based on the result of the analysis of the signal input through the plurality of microphones 531*a* to 531*n*. The result of the determination may be displayed on the screen through the displaying unit 540. For example, the position of the microphone selected from among the plurality of microphones provided in the electronic device 500 may be displayed on the screen.

Further, although not shown in FIG. 5, at least one of the function analyzer 324, the user configuring unit 325, or the environment analyzer 326 described above in connection with FIG. 3 may be included in the controller 510 of FIG. 5, and according to an embodiment of the present disclosure, the input/output determining unit 513 may further consider the result of the analysis by the further included component.

For example, according to an embodiment of the present disclosure, the input/output determining unit 513 may determine the microphone for use among the plurality of microphones 531a to 531n based on at least one of the pieces of information provided the signal analyzer 512, the function analyzer, the user configuring unit, or the environment analyzer. Further, the input/output determining unit 513 may determine the microphone or speaker to be used by assigning priority or weight to at least one of the pieces of information provided.

Further, according to an embodiment of the present disclosure, the input/output determining unit 513 may be implemented in an external server connected via communication through the communication unit 560. Accordingly, the information determined by the signal analyzer 512 may be transmitted through the communication unit 560 to the server. The server may determine the microphone or speaker for use based on the information transmitted through the communication unit 560 of the electronic device 500. The determined result may be provided from the server to the electronic device 500.

Figure 6:
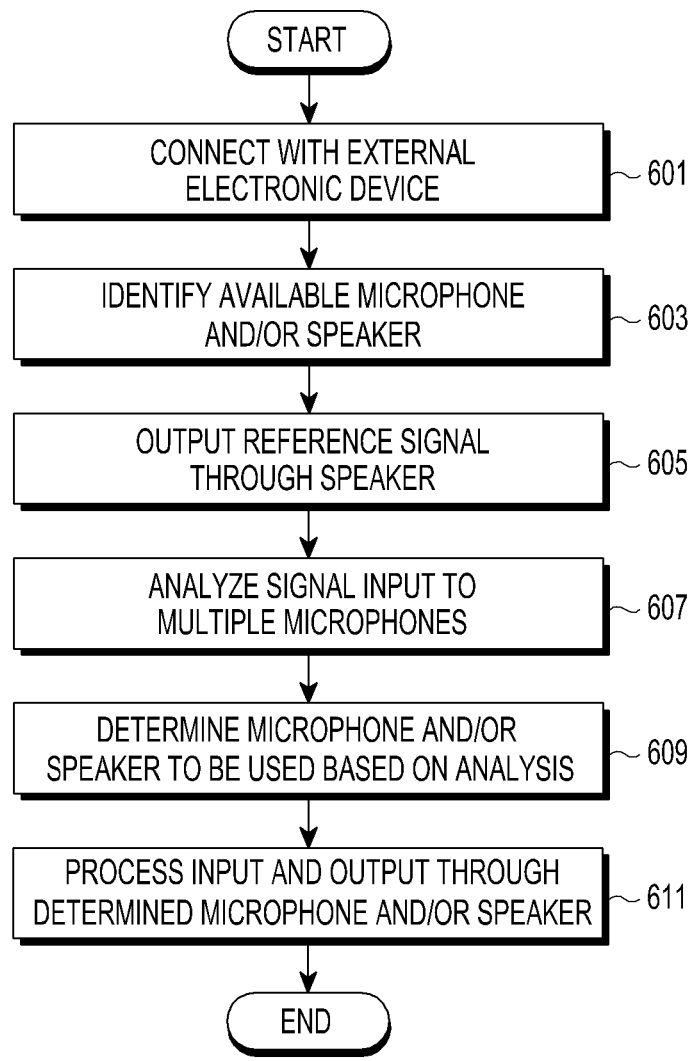
FIG. 6 is a flowchart illustrating an input/output control procedure by an electronic device according to an embodiment of the present disclosure.

FIG. 6 is a flowchart illustrating an input/output control procedure by an electronic device according to an embodiment of the present disclosure.

Referring to FIG. 6, when the electronic device connects with an external electronic device via communication, and at least one application or at least one function using a microphone or speaker runs in operation 601, the available microphone and/or speaker of the external electronic device connected with the electronic device via communication may be identified in operation 603.

According to an embodiment of the present disclosure, a reference signal may be output through the speaker of the electronic device in operation 605. In operation 607, the signal input to the plurality of microphones identified to be available may be analyzed. The plurality of microphones may include the microphone provided in the electronic device or at least one microphone provided in at least one external electronic device connected via communication with the electronic device.

In operation 609, the electronic device may determine the microphone and/or speaker to be used for the running application or function from among the available microphones and/or speakers based on the analysis.

In operation 611, the electronic device may perform processing so that the signal may be input or output through the determined microphone and/or speaker.

At least one operation of the operations shown in FIG. 6 may be omitted, and at least one other operation may be added between the operations. Further, the operations shown in FIG. 6 may be processed in the order shown or the order of at least one operation and another operation may be varied. Further, the operations shown in FIG. 6 may be performed in the electronic device or server. An implementation may be made such that at least one operation of the operations shown in FIG. 6 is performed in the electronic device while the other operations are performed in a server.

According to an embodiment of the present disclosure, a method for controlling input and output by an electronic device may comprise generating a reference signal, outputting the generated reference signal through a first speaker provided in the electronic device, receiving a first signal input through a first microphone provided in the electronic device, receiving a second signal input through a second microphone provided in an external electronic device, and determining whether to use the first microphone or the second microphone based on at least one of the first signal input through the first microphone and the second signal input through the second microphone.

According to an embodiment of the present disclosure, the method may further comprise identifying whether a microphone or a speaker provided in at least one external electronic device connected with the electronic device via communication is available.

According to an embodiment of the present disclosure, the determining of whether to use the first microphone or the second microphone is based on the reference signal.

According to an embodiment of the present disclosure, the reference signal is a white noise signal or a voice signal spoken out by a user.

According to an embodiment of the present disclosure, the reference signal may include a voice signal spoken out by the user.

According to an embodiment of the present disclosure, the determining of whether to use the first microphone or the second microphone is based on user context information.

According to an embodiment of the present disclosure, the user context information may include at least one of a position of the user, a time, whether the user moves, a degree of ambient noise, an ambient brightness, etc.

According to an embodiment of the present disclosure, the determining of whether to use the first microphone or the second microphone is based on information regarding an application to be run on the electronic device.

According to an embodiment of the present disclosure, the determining of whether to use the first microphone or the second microphone is based on at least one function to be run on the electronic device.

According to an embodiment of the present disclosure, the determining of whether to use the first microphone or the second microphone is based on user context information configured by a user.

Figure 7A:
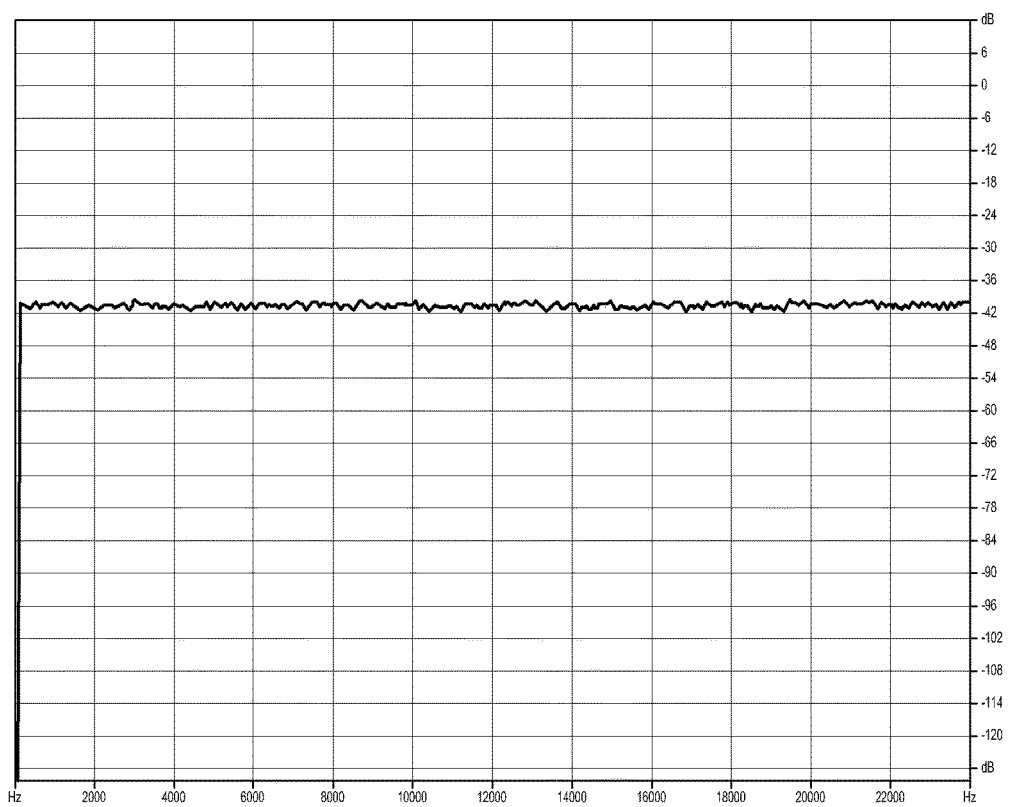
FIG. 7A is a view illustrating a waveform of a reference signal according to an embodiment of the present disclosure.
Figure 7B:
FIG. 7B is a view illustrating a waveform of a signal input through a first microphone according to an embodiment of the present disclosure.

FIG. 7A is a view illustrating a waveform of a reference signal according to an embodiment of the present disclosure. FIG. 7B is a view illustrating a waveform of a signal input through a first microphone (a microphone relatively distant from the speaker) according to an embodiment of the present disclosure, and FIG. 7C is a view illustrating a waveform of a signal input through a second microphone (a microphone relatively close to the speaker) according to an embodiment of the present disclosure.

Figure 7C:
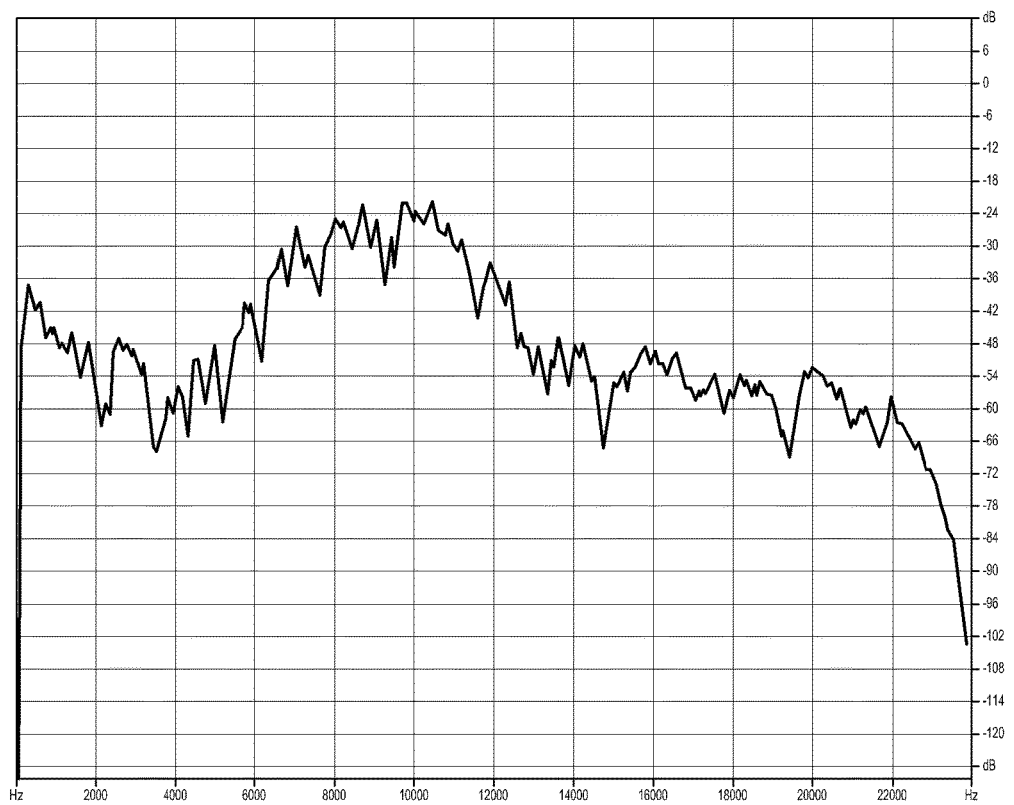
FIG. 7C is a view illustrating a waveform of a signal input through a second microphone according to an embodiment of the present disclosure.

Referring to FIGS. 7A to 7C, the reference signal may be represented in the strength (dB) of signal per frequency as shown in FIG. 7A, and when the reference signal is output through the speaker, the signal input through the microphone may be analyzed as shown in FIGS. 7B and 7C.

According to an embodiment of the present disclosure, the signal analyzers 322 and 512 may determine which microphone to be used by comparing the reference signal shown in FIG. 7A with the signal input through each microphone as shown in FIGS. 7B and 7C or comparing the signals input through the microphones shown in FIGS. 7B and 7C.

Figure 8A:
FIG. 8A is a view illustrating a waveform of a reference signal according to an embodiment of the present disclosure.
Figure 8B:
FIG. 8B is a view illustrating a waveform of a signal input through a first microphone according to an embodiment of the present disclosure.

FIG. 8A is a view illustrating a waveform of a reference signal that is a voice spoken out by the user according to an embodiment of the present disclosure. FIG. 8B is a view illustrating a waveform of a signal input through a first microphone (a microphone relatively distant from the speaker) according to an embodiment of the present disclosure, and FIG. 8C is a view illustrating a waveform of a signal input through a second microphone (a microphone relatively close to the speaker) according to an embodiment of the present disclosure.

Figure 8C:
FIG. 8C is a view illustrating a waveform of a signal input through a second microphone according to an embodiment of the present disclosure.

Referring to FIGS. 8A to 8C, the reference signal generated as the user speaks may be represented in the strength (dB) of signal per frequency as shown in FIG. 8A, and when the reference signal is output through the speaker, the signal input through the microphone may be analyzed as shown in FIGS. 8B and 8C.

According to an embodiment of the present disclosure, the signal analyzers 322 and 512 may determine which microphone to be used by comparing the reference signal shown in FIG. 8A with the signal input through each microphone as shown in FIGS. 8B and 8C or comparing the signals input through the microphones shown in FIGS. 8B and 8C.

Figure 9:
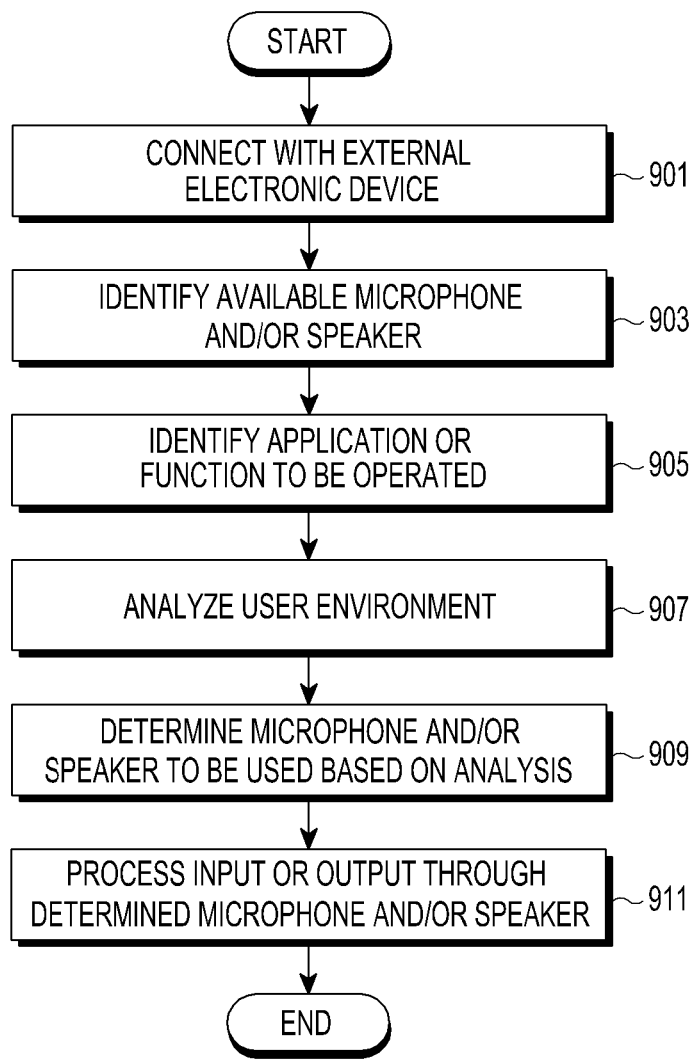
FIG. 9 is a flowchart illustrating an input/output control procedure by an electronic device according to an embodiment of the present disclosure.

FIG. 9 is a flowchart illustrating an input/output control procedure by an electronic device according to an embodiment of the present disclosure.

Referring to FIG. 9, when an electronic device connects with an external electronic device via communication, and at least one application or at least one function using a microphone or speaker runs in operation 901, the available microphone and/or speaker of the external electronic device connected with the electronic device via communication may be identified in operation 903.

According to an embodiment of the present disclosure, in operation 905, an application or function to be operated may be identified or its type may be determined. For example, the application to be operated may be identified as a phone application, a video playback application, or a navigation.

In operation 907, according to an embodiment of the present disclosure, the user environment may be analyzed. For example, the user environment may include the position of user, time, whether the user moves, the degree of ambient noise, and ambient brightness.

In operation 909, a microphone and/or speaker to be used for an application or function to be currently run may be determined based on the identified microphone and/or speaker available, the identified application or function to be operated, or the result of the analysis of the user environment.

In operation 911, the electronic device may perform processing so that the signal may be input or output through the determined microphone and/or speaker.

At least one of the operations shown in FIG. 9 may be omitted, and at least one other operation may be added between the operations. Further, the operations shown in FIG. 9 may be processed in the order shown or the order of at least one operation and other operation may be varied. Further, the operations shown in FIG. 9 may be performed in the electronic device or server. Such an implementation may be made that at least one operation of the operations shown in FIG. 9 is performed in the electronic device while the other operations are performed in a server.

Hereinafter, various examples implemented in an electronic device are described according to various embodiments of the present disclosure with reference to FIGS. 10 to 15.

Figure 10:
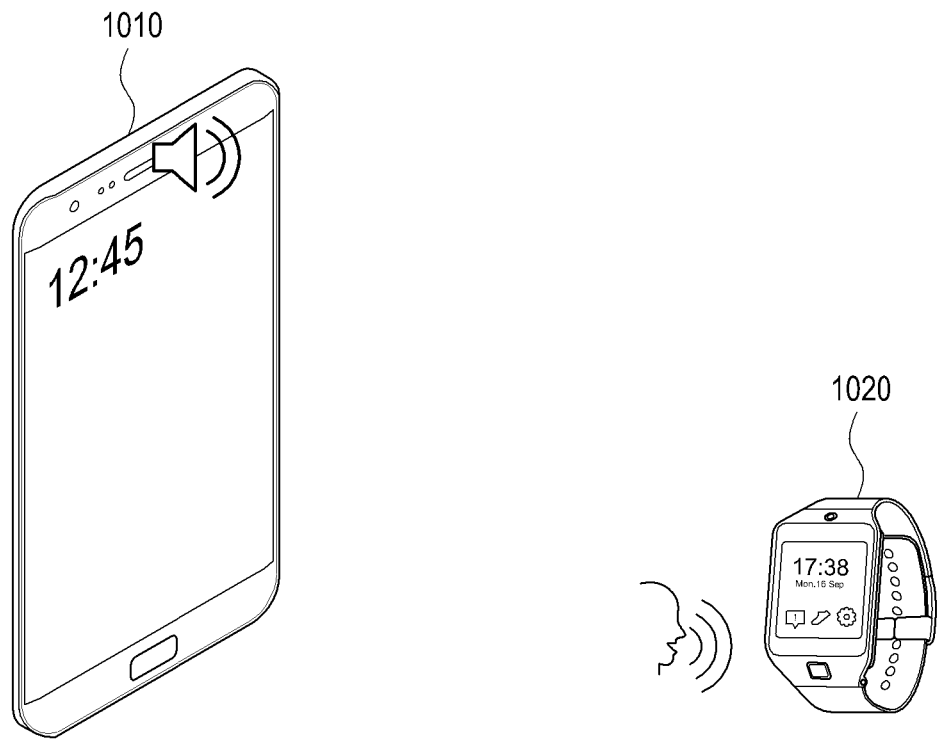
FIG. 10 is a view illustrating an example in which a microphone or speaker is selected in electronic devices according to an embodiment of the present disclosure.

FIG. 10 is a view illustrating an example in which a microphone or speaker is selected in electronic devices according to an embodiment of the present disclosure.

Referring to FIG. 10, when the user pairs a smartphone 1010 with a wearable device 1020 and uses them, the electronic device to use the microphone or the electronic device to use the speaker may be determined by various methods as described above.

For example, as shown in FIG. 10, when the user using simultaneously pairing and using the watch-type wearable device 1020 and the smartphone 1010 performs a calling function, a microphone or speaker may be determined so that the opposite party's voice may be output using the speaker of the smartphone 1010, and the user's voice may be input through the microphone of the watch-type wearable device 1020.

Figure 11:
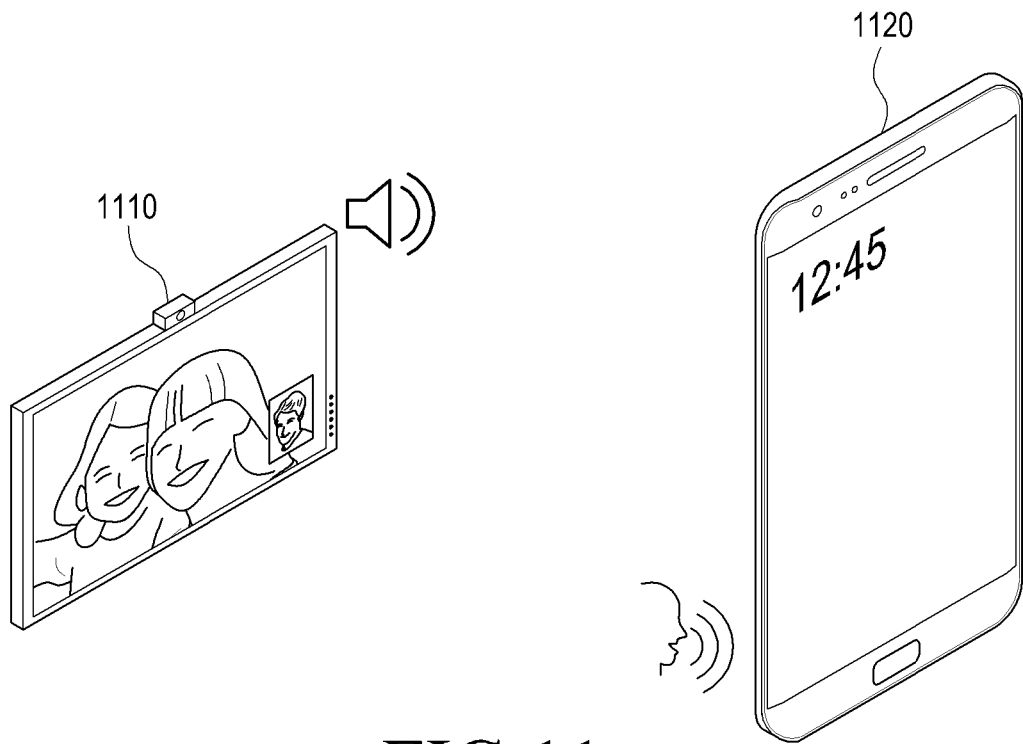
FIG. 11 is a view illustrating an example in which a microphone or speaker is selected in electronic devices according to an embodiment of the present disclosure.

FIG. 11 is a view illustrating an example in which a microphone or speaker is selected in electronic devices according to an embodiment of the present disclosure.

Referring to FIG. 11, when the user connects a TV 1110 (e.g., a smart TV) with a smartphone 1120 and uses them, the electronic device to use the microphone or the electronic device to use the speaker may be determined by various methods as described above.

For example, when the user performs a calling function using the smartphone 1120 in the living room with the TV 1110, a microphone or speaker may be determined so that the opposite party's voice may be output through the speaker of the TV 1110, and the user's voice may be input through the microphone of the smartphone 1120.

Figure 12:
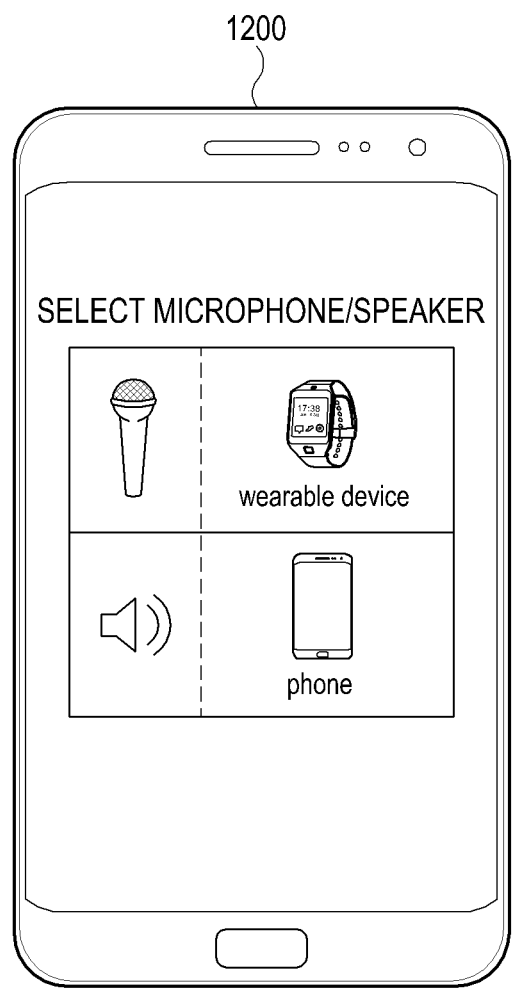
FIG. 12 is a view illustrating an example of a screen displaying a result of selecting a microphone or a speaker in an electronic device according to an embodiment of the present disclosure.

FIG. 12 is a view illustrating an example of a screen displaying a result of selecting a microphone or speaker in an electronic device according to an embodiment of the present disclosure.

Referring to FIG. 12, when an electronic device to use the microphone is determined as a watch-type wearable device and the electronic device to use the speaker is determined as a smartphone 1200 among a plurality of electronic devices mutually connected via communication as shown in FIG. 12, the image of the electronic device corresponding to the microphone and speaker selected for current use as shown in FIG. 12 may be displayed on a screen of the smartphone 1200.

Figure 13:
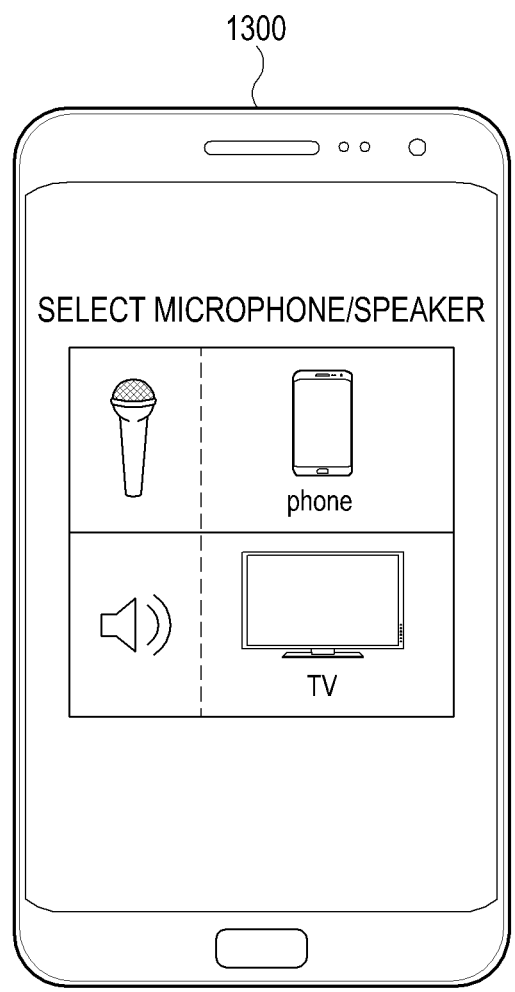
FIG. 13 is a view illustrating an example of a screen displaying a result of selecting a microphone or a speaker in an electronic device according to an embodiment of the present disclosure.

FIG. 13 is a view illustrating an example of a screen displaying a result of selecting a microphone or speaker in an electronic device according to an embodiment of the present disclosure.

Referring to FIG. 13, when an electronic device to use the microphone is determined as a smartphone 1300 and an electronic device to use the speaker is determined as a TV among a plurality of electronic devices mutually connected via communication as shown in FIG. 11, the image of the electronic device corresponding to the microphone and speaker selected for current use as shown in FIG. 13 may be displayed on a screen of the smartphone 1300.

Figure 14A:
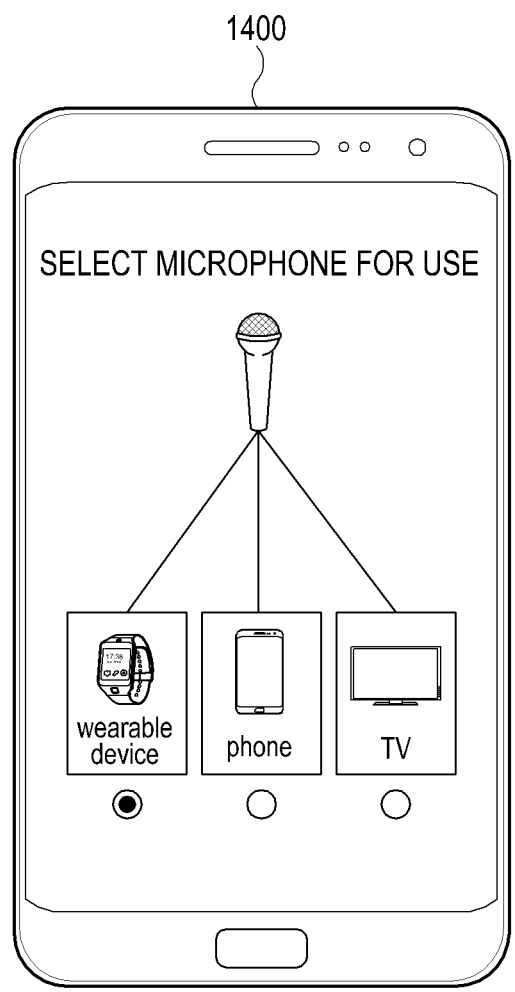
FIG. 14A is a view illustrating an example of a screen where a microphone for use by a user is selected from among microphones available in a plurality of electronic devices according to an embodiment of the present disclosure.

FIG. 14A is a view illustrating an example of a screen where a microphone for use by a user is selected from among microphones available in a plurality of electronic devices according to an embodiment of the present disclosure.

Referring to FIG. 14A, a list or image of at least one electronic device connected via wired or wireless communication to the electronic device 1400 (e.g., the smartphone) currently used by the user may be displayed on a screen of the electronic device 1400. According to an embodiment of the present disclosure, a list or image of electronic devices having a microphone among the at least one electronic device connected to the electronic device 1400 may be implemented to be displayed on the screen.

For example, the user may select an electronic device corresponding to the microphone for use from among the plurality of electronic devices displayed on the screen. By the selection of the microphone, the controller of the electronic device 1400 may perform control to activate the microphone of the selected electronic device and to deactivate the microphones of unselected electronic devices.

Figure 14B:
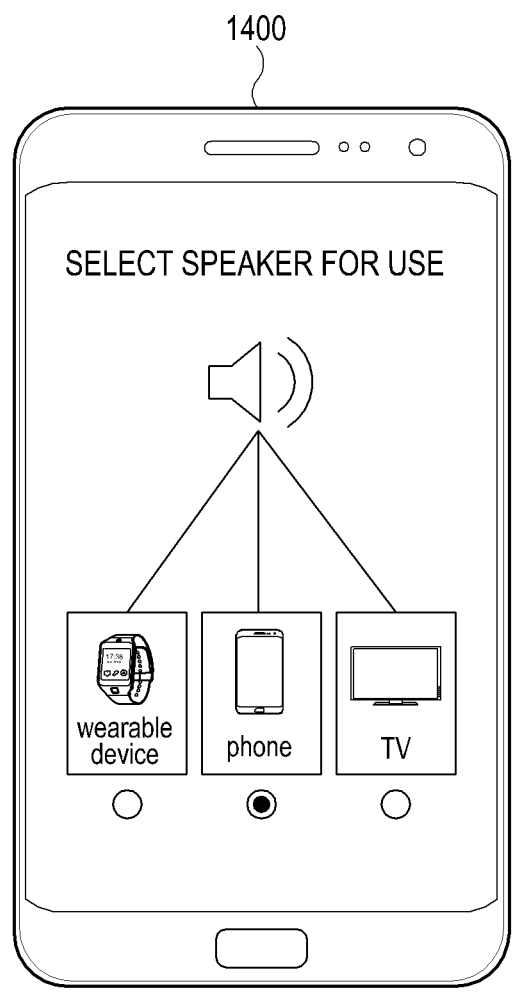
FIG. 14B is a view illustrating an example of a screen where a speaker for use by a user is selected from among speakers available in a plurality of electronic devices according to an embodiment of the present disclosure.

FIG. 14B is a view illustrating an example of a screen where a speaker for use by a user is selected from among speakers available in a plurality of electronic devices according to an embodiment of the present disclosure.

Referring to FIG. 14B, a list or image of at least one electronic device connected via wired or wireless communication to the electronic device 1400 (e.g., the smartphone) currently used by the user may be displayed on the screen of the electronic device 1400. According to an embodiment of the present disclosure, a list or image of electronic devices having a speaker among the at least one electronic device connected to the electronic device 1400 may be implemented to be displayed on the screen.

For example, the user may select an electronic device corresponding to the speaker for use from among the plurality of electronic devices displayed on the screen. By the selection of the speaker, the controller of the electronic device 1400 may perform control to activate the speaker of the selected electronic device and to deactivate the speakers of unselected electronic devices.

Figure 15A:
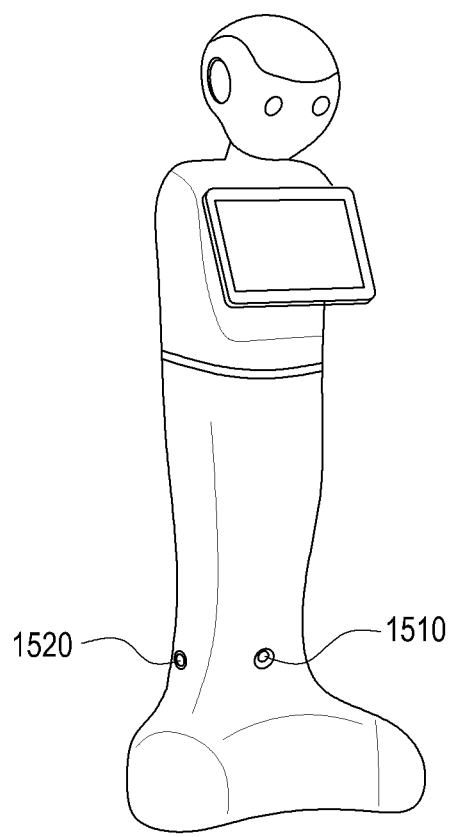
FIGS. 15A and 15B are views illustrating a robot having a plurality of microphones according to an embodiment of the present disclosure.
Figure 15B:
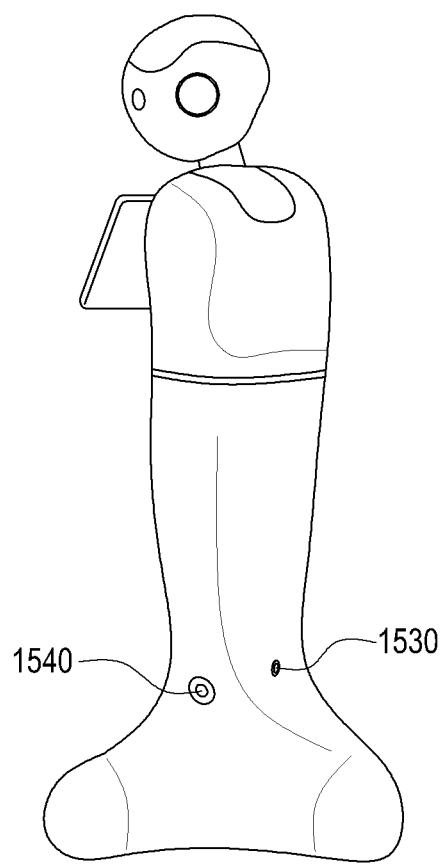

FIGS. 15A and 15B are views illustrating a robot having a plurality of microphones according to an embodiment of the present disclosure.

Referring to FIGS. 15A and 15B, according to an embodiment of the present disclosure, a microphone for input may be determined by a robot including a plurality of microphones 1510, 1520, 1530, and 1540.

For example, the microphone for use may be determined by outputting a reference signal through a speaker provided in the robot and analyzing the signals input through the plurality of microphones 1510, 1520, 1530, and 1540.

Figure 16:
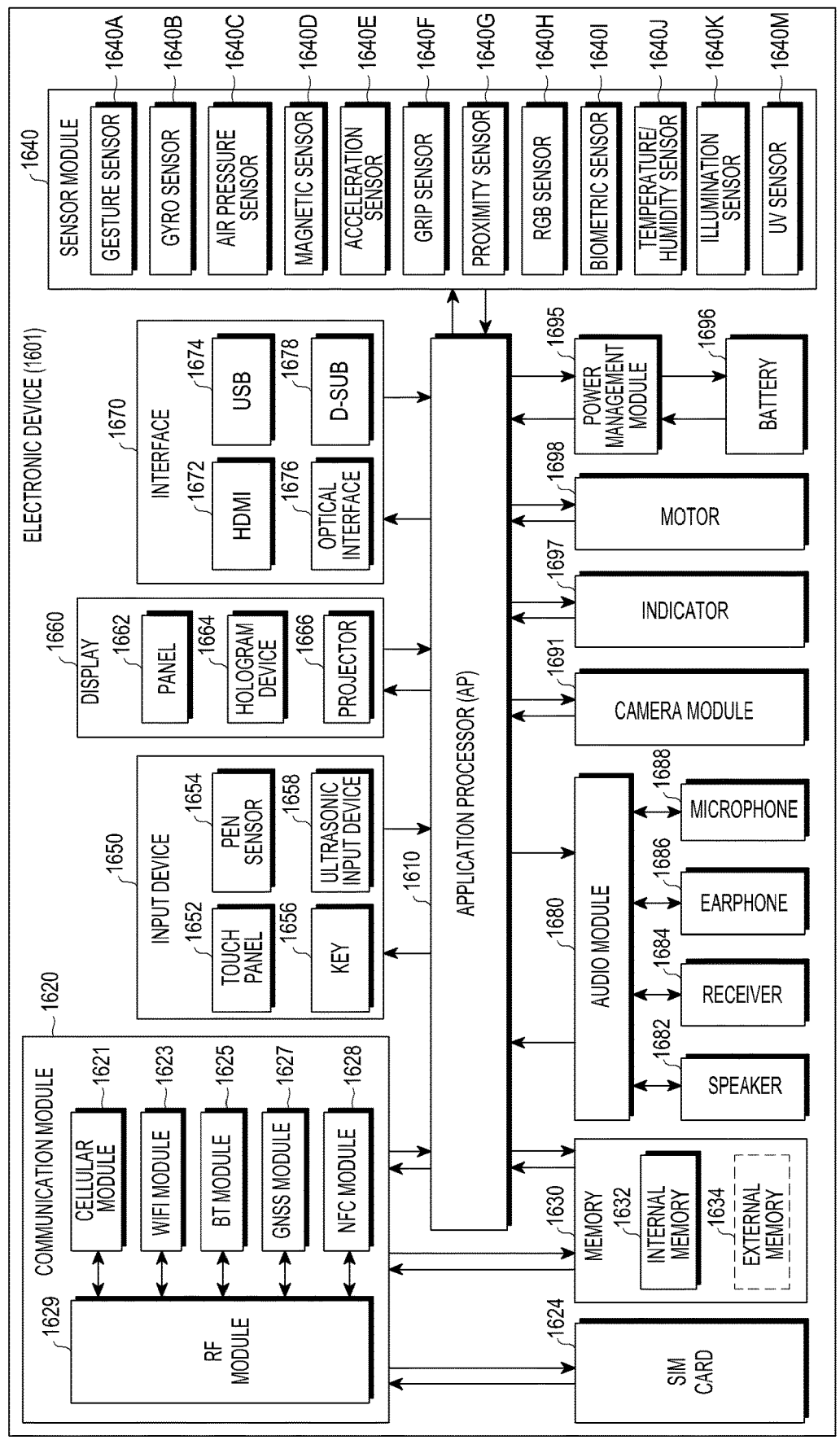
FIG. 16 is a block diagram illustrating a structure of an electronic device according to an embodiment of the present disclosure.

FIG. 16 is a block diagram illustrating an electronic device according to an embodiment of the present disclosure.

Referring to FIG. 16, an electronic device 1601 may include the whole or part of, e.g., the electronic device shown in FIGS. 1 to 5. The electronic device 1601 may include one or more APs 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may control multiple hardware and software components connected to the AP 1610 by running, e.g., an OS or application programs, and the AP 1510 may process and compute various data. The AP 1610 may be implemented in, e.g., a system on chip (SoC). According to an embodiment of the present disclosure, the AP 1610 may further include a graphics processing unit (GPU) and/or an image signal processor. The AP 1610 may include at least some (e.g., the cellular module 1621) of the components shown in FIG. 16. The AP 1610 may load a command or data received from at least one of other components (e.g., a non-volatile memory) on a volatile memory, process the command or data, and store various data in the non-volatile memory.

The communication module 1620 may include, e.g., a cellular module 1621, a Wi-Fi module 1623, a BT module 1625, a GPS module 1627, a near-field communication (NFC) module 1628, and a radio frequency (RF) module 1629.

The cellular module 1621 may provide voice call, video call, text, or Internet services through a communication network (e.g., a LTE, LTE-A, CDMA, WCDMA, UMTS, WiBro, or GSM network). The cellular module 1621 may perform identification or authentication on the electronic device 1601 in the communication network using a SIM (e.g., the SIM card 1624). According to an embodiment of the present disclosure, the cellular module 1621 may perform at least some of the functions providable by the AP 1610. According to an embodiment of the present disclosure, the cellular module 1621 may include a CP.

The Wi-Fi module 1623, the BT module 1625, the GPS module 1627, or the NFC module 1628 may include a process for, e.g., processing data communicated through the module. At least some (e.g., two or more) of the cellular module 1621, the Wi-Fi module 1623, the BT module 1625, the GPS module 1627, and the NFC module 1628 may be included in a single integrated circuit (IC) or an IC package.

The RF module 1629 may communicate data, e.g., communication signals (e.g., RF signals). The RF module 1629 may include, e.g., a transceiver, a power amplifier module (PAM), a frequency filter, a low noise amplifier (LNA), or an antenna. According to an embodiment of the present disclosure, at least one of the cellular module 1621, the Wi-Fi module 1623, the BT module 1625, the GPS module 1627, or the NFC module 1628 may communicate RF signals through a separate RF module.

The SIM card 1624 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 1630 (e.g., the memory 130) may include, e.g., an internal memory 1632 or an external memory 1634. The internal memory 1632 may include at least one of, e.g., a volatile memory (e.g., a dynamic random access memory (DRAM), a static RAM (SRAM), a synchronous DRAM (SDRAM), etc.) or a non-volatile memory (e.g., a one time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1634 may include a flash drive, e.g., a compact flash (CF) memory, a secure digital (SD) memory, a micro-SD memory, a mini-SD memory, an extreme digital (xD) memory, or a Memory Stick™. The external memory 1634 may be functionally and/or physically connected with the electronic device 1601 via various interfaces.

The sensor module 1640 may measure a physical quantity or detect an operational state of the electronic device 1601, and the sensor module 940 may convert the measured or detected information into an electrical signal. The sensor module 1640 may include at least one of, e.g., a gesture sensor 1640A, a gyro sensor 1640B, an air pressure sensor 1640C, a magnetic sensor 1640D, an acceleration sensor 1640E, a grip sensor 1640F, a proximity sensor 1640G, a color sensor 1640H such as a red-green-blue (RGB) sensor, a bio sensor 1640I, a temperature/humidity sensor 1640J, an illumination sensor 1640K, or an ultra violet (UV) sensor 1640M. Additionally or alternatively, the sensing module 1640 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1640 may further include a control circuit for controlling at least one or more of the sensors included in the sensing module. According to an embodiment of the present disclosure, the electronic device 1601 may further include a processor configured to control the sensor module 1640 as part of an AP 1610 or separately from the AP 1610, and the electronic device 901 may control the sensor module 1640 while the AP is in a sleep mode.

The input unit 1650 may include, e.g., a touch panel 1652, a (digital) pen sensor 1654, a key 1656, or an ultrasonic input device 1658. The touch panel 1652 may use at least one of capacitive, resistive, IR, or ultrasonic methods. The touch panel 1652 may further include a control circuit. The touch panel 1652 may further include a tactile layer and may provide a user with a tactile reaction.

The (digital) pen sensor 1654 may include, e.g., a part of a touch panel or a separate sheet for recognition. The key 1656 may include e.g., a physical button, optical key or key pad. The ultrasonic input device 1658 may use an input tool that generates an ultrasonic signal and enable the electronic device 1601 to identify data by sensing the ultrasonic signal to a microphone (e.g., a microphone 1688).

The display 1660 may include a panel 1662, a hologram device 1664, or a projector 1666. The panel 1662 may be implemented to be flexible, transparent, or wearable. The panel 1662 may also be incorporated with the touch panel 1652 in a module. The hologram device 1664 may make three dimensional (3D) images (holograms) in the air by using light interference. The projector 1666 may display an image by projecting light onto a screen. The screen may be, for example, located inside or outside of the electronic device 1601. In accordance with an embodiment, the display 1660 may further include a control circuit to control the panel 1662, the hologram device 1664, or the projector 1666.

The interface 1670 may include e.g., a HDMI 1672, a USB 1674, an optical interface 1676, or a D-subminiature (D-sub) 1678. Additionally or alternatively, the interface 1670 may include a mobile high-definition link (MHL) interface, an SD card/multimedia card (MMC) interface, or IR data association (IrDA) standard interface.

The audio module 1680 may convert a sound into an electric signal or vice versa, for example. The audio module 1680 may process sound information input or output through e.g., a speaker 1682, a receiver 1684, an earphone 1686, or the microphone 1688.

The camera module 1691 may be a device for capturing still images and videos, and may include, according to an embodiment of the present disclosure, one or more image sensors (e.g., front and back sensors), a lens, an image signal processor (ISP), or a flash such as an LED or xenon lamp.

The power manager module 1695 may manage power of the electronic device 1601, for example. Although not shown, according to an embodiment of the present disclosure, a power management IC (PMIC), a charger IC, or a battery or fuel gauge is included in the power manager module 1695. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1696, a voltage, a current, or a temperature while the battery 1596 is being charged. The battery 1696 may include, e.g., a rechargeable battery or a solar battery.

The indicator 1697 may indicate a particular state of the electronic device 1601 or a part of the electronic device (e.g., the AP 1610), including e.g., a booting state, a message state, or recharging state. The motor 1698 may convert an electric signal to a mechanical vibration and may generate a vibrational or haptic effect. Although not shown, a processing unit for supporting mobile TV, such as a GPU may be included in the electronic device 1601. The processing unit for supporting mobile TV may process media data conforming to a standard for digital multimedia broadcasting (DMB), digital video broadcasting (DVB), or mediaFLO™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 17:
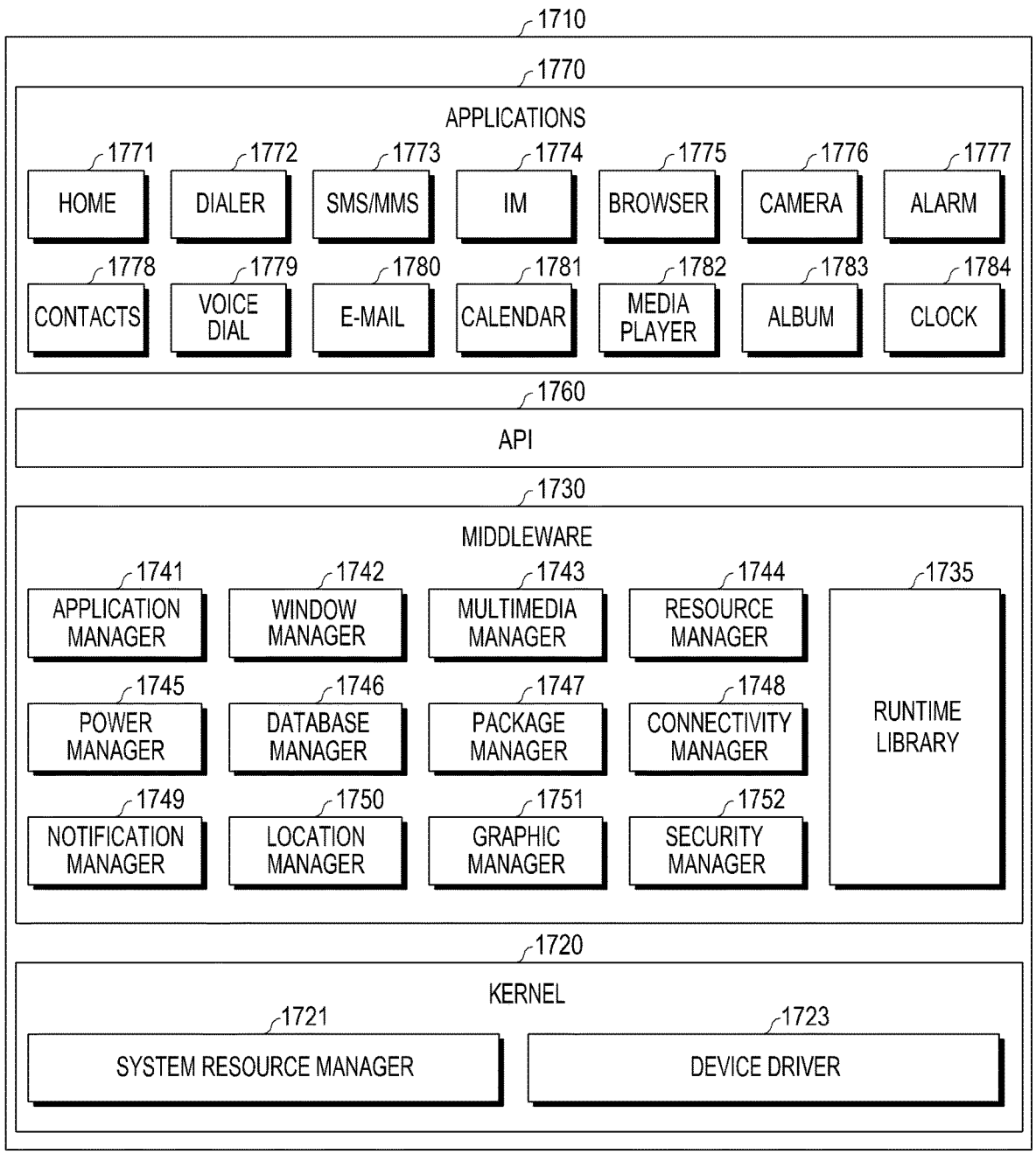
FIG. 17 is a block diagram illustrating a program module according to an embodiment of the present disclosure.

FIG. 17 is a block diagram illustrating a program module according to an embodiment of the present disclosure.

Referring to FIG. 17, a program module 1710 may include an OS controlling resources related to the electronic device and/or various applications (e.g., the application program) driven on the OS. The OS may include, e.g., Android, iOS, Windows, Symbian, Tizen, or Bada.

The program 1710 may include, e.g., a kernel 1720, middleware 1730, an API 1760, and/or an application 1770. At least a part of the program module 1710 may be preloaded on the electronic device or may be downloaded from a server.

The kernel 1720 may include, e.g., a system resource manager 1721 or a device driver 1723. The system resource manager 1721 may perform control, allocation, or recovery of system resources. According to an embodiment of the present disclosure, the system resource manager 1721 may include a process managing unit, a memory managing unit, or a file system managing unit. The device driver 1723 may include, e.g., a display driver, a camera driver, a BT driver, a shared memory driver, a USB driver, a keypad driver, a Wi-Fi driver, an audio driver, or an inter-process communication (IPC) driver.

The middleware 1730 may provide various functions to the application 1770 through the API 1760 so that the application 1770 may efficiently use limited system resources in the electronic device or provide functions jointly required by applications 1770. According to an embodiment of the present disclosure, the middleware 1730 may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include a library module used by a compiler in order to add a new function through a programming language while, e.g., the application 1770 is being executed. The runtime library 1735 may perform input/output management, memory management, or operation on arithmetic functions.

The application manager 1741 may manage the life cycle of at least one application of, e.g., the applications 1770. The window manager 1742 may manage graphical user interface (GUI) resources used on the screen. The multimedia manager 1743 may grasp formats necessary to play various media files and use a codec appropriate for a format to perform encoding or decoding on media files. The resource manager 1744 may manage resources, such as source code of at least one of the applications 1770, memory or storage space.

The power manager 1745 may operate together with, e.g., a basic input/output system (BIOS) to manage battery or power and provide power information necessary for operating the electronic device. The database manager 1746 may generate, search, or vary a database to be used in at least one of the applications 1770. The package manager 1747 may manage installation or update of an application that is distributed in the form of a package file.

The connectivity manager 1748 may manage wireless connectivity, such as, e.g., Wi-Fi or BT. The notification manager 1749 may display or notify an event, such as a coming message, appointment, or proximity notification, of the user without interfering with the user. The location manager 1750 may manage locational information on the electronic device. The graphic manager 1751 may manage graphic effects to be offered to the user and their related user interface. The security manager 1752 may provide various security functions necessary for system security or user authentication. According to an embodiment of the present disclosure, when the electronic device (e.g., the electronic device of FIG. 8) has telephony capability, the middleware 1730 may further include a telephony manager for managing voice call or video call functions of the electronic device.

The middleware 1730 may include a middleware module forming a combination of various functions of the above-described components. The middleware 1730 may provide a specified module per type of the OS in order to provide a differentiated function. Further, the middleware 1730 may dynamically omit some existing components or add new components.

The API 1760 may be a set of, e.g., API programming functions and may have different configurations depending on OSs. For example, in the case of Android or iOS, one API set may be provided per platform, and in the case of Tizen, two or more API sets may be offered per platform.

The application 1770 may include one or more applications that may provide functions such as, e.g., a home 1771, a dialer 1772, a short message service (SMS)/multimedia messaging service (MMS) 1773, an instant message (IM) 1774, a browser 1775, a camera 1776, an alarm 1777, a contact 1778, a voice dial 1779, an email 1780, a calendar 1781, a media player 1782, an album 1783, or a clock 1784, a health-care (e.g., measuring the degree of workout or blood sugar), or provision of environmental information (e.g., provision of air pressure, moisture, or temperature information).

According to an embodiment of the present disclosure, the application 1770 may include an application (hereinafter, "information exchanging application" for convenience) supporting information exchange between the electronic device (e.g., the electronic device of FIGS. 1 to 5) and an external electronic device. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device. Further, the notification relay application may receive notification information from, e.g., the external electronic device and may provide the received notification information to the user. The device management application may perform at least one function of the external electronic device communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 1770 may include an application (e.g., a health-care application) designated depending on the attribute (e.g., as an attribute of the electronic device, the type of electronic device is a mobile medical device) of the external electronic device. According to an embodiment of the present disclosure, the application 1770 may include an application received from the external electronic device. According to an embodiment of the present disclosure, the application 1770 may include a preloaded application or a third party application downloadable from a server. The names of the components of the program module 1710 according to the shown embodiment may be varied depending on the type of OS.

According to an embodiment of the present disclosure, at least a part of the program module 1710 may be implemented in software, firmware, hardware, or in a combination of two or more thereof. At least a part of the programming module 1710 may be implemented (e.g., executed) by e.g., a processor (e.g., the AP 3310). At least a part of the program module 1710 may include e.g., a module, program, routine, set of instructions, process, or the like for performing one or more functions.

The term 'module' or 'functional unit' may refer to a unit including one of hardware, software, and firmware, or a combination thereof. The term 'module' or 'functional unit' may be interchangeably used with a unit, logic, logical block, component, or circuit. The term 'module' or 'functional unit' may be a minimum unit or part of an integrated component. The 'module' may be a minimum unit or part of performing one or more functions. The 'module' or 'functional unit' may be implemented mechanically or electronically. For example, the 'module' or 'functional unit' may include at least one of application specific IC (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the controller 320), may enable the processor to carry out a corresponding function. The computer-readable storage medium may be e.g., the storage unit 330.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing instructions, the instructions configured to be executed by at least one processor to enable the at least one processor to perform at least one operation, which may comprise generating a reference signal, outputting the generated reference signal through a first speaker provided in the electronic device, receiving a first signal input through a first microphone provided in the electronic device, receiving a second signal input through a second microphone provided in an external electronic device, and determining whether to use the first microphone or the second microphone based on at least one of the first signal input through the first microphone and the second signal input through the second microphone.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a first speaker;
 a first microphone;
 a communication circuit; and
 a processor configured to:
  identify whether the electronic device is wirelessly connected with an external electronic device having a second speaker and a second microphone,
  in response to identifying that the electronic device is wirelessly connected with the external electronic device, output a reference signal through the first speaker,
  receive a first signal corresponding to the reference signal inputted into the electronic device through the first microphone,
  receive, from the external electronic device, through the communication circuit, a second signal corresponding to the reference signal inputted into the external electronic device through the second microphone,
  compare the first signal with the second signal,
  identify an application that is being operated by the electronic device, and
  based on a result of the comparing and the application:
   select the first speaker of the electronic device as an available speaker and the second microphone of the external electronic device as an available microphone, or
   select the second speaker of the external electronic device as the available speaker and the first microphone of the electronic device as the available microphone.

2. The electronic device of claim 1, further comprising a display,
 wherein the processor is further configured to display a user interface on the display for receiving user input for selecting the available speaker and the available microphone.

3. The electronic device of claim 2, wherein the user interface includes icons corresponding to the electronic device and the external electronic device respectively.

4. The electronic device of claim 1, wherein the processor is further configured to identify whether a microphone or a speaker provided in at least one external electronic device connected with the electronic device via communication is available.

5. The electronic device of claim 1, wherein the reference signal includes at least one of a white noise signal and a voice signal of a user.

6. The electronic device of claim 1, wherein the processor is further configured to:
 identify context information, and
 select the available speaker from the first speaker and the second speaker and select the available microphone from the first microphone and the second microphone based on the context information.

7. The electronic device of claim 6, wherein the context information includes at least one of a position of a user, a time, whether the user moves, a magnitude of ambient noise, or an ambient brightness.

8. The electronic device of claim 1, wherein the processor is further configured to:
 identify a combination that is selected by a user, and
 select the available speaker from the first speaker and the second speaker and select the available microphone from the first microphone and the second microphone based on the combination.

9. A method for controlling input and output by an electronic device including a first speaker and a first microphone, the method comprising:
 identifying whether the electronic device is wirelessly connected with an external electronic device having a second speaker and a second microphone;
 in response to identifying that the electronic device is wirelessly connected with the external electronic device, outputting a reference signal through the first speaker;
 receiving a first signal corresponding to the reference signal inputted into the electronic device through the first microphone;
 receiving, from the external electronic device, through a communication circuit of the electronic device, a second signal corresponding to the reference signal inputted into the external electronic device through the second microphone;
 comparing the first signal with the second signal;
 identifying an application that is being operated by the electronic device; and
 based on a result of the comparing and the application:
  selecting the first speaker of the electronic device as an available speaker and the second microphone of the external electronic device as an available microphone, or selecting the second speaker of the external electronic device as the available speaker and the first microphone of the electronic device as the available microphone.

10. The method of claim 9, further comprising displaying a user interface on a display for receiving user input for selecting the available speaker and the available microphone.

11. The method of claim 10, wherein the user interface includes icons corresponding to the electronic device and the external electronic device respectively.

12. The method of claim 9, wherein the reference signal includes at least one of a white noise signal and a voice signal of a user.

13. The method of claim 9, further comprising:
displaying a first image of the first microphone and a second image of the second microphone.

14. The method of claim 9, further comprising:
identifying context information,
wherein the selecting of the available speaker from the first speaker and the second speaker and the selecting of the available microphone from the first microphone and the second microphone is based on the context information.

15. The method of claim 14, wherein the context information includes at least one of a position of a user, a time, whether the user moves, a magnitude of ambient noise, or an ambient brightness.

16. The method of claim 9, further comprising:
identifying a combination that is selected by a user,
wherein the selecting of the available speaker from the first speaker and the second speaker and the selecting of the available microphone from the first microphone and the second microphone is based on the combination.

17. A non-transitory computer-readable storage medium configured to store one or more computer programs including instructions that, when executed by at least one processor of an electronic device comprising a first speaker and a first microphone, cause the at least one processor to:
identify whether the electronic device is wirelessly connected with an external electronic device having a second speaker and a second microphone,
in response to identifying that the electronic device is wirelessly connected with the external electronic device, output a reference signal through the first speaker,
receive a first signal corresponding to the reference signal inputted into the electronic device through the first microphone,
receive, from the external electronic device, through a communication circuit of the electronic device, a second signal corresponding to the reference signal inputted into the external electronic device through the second microphone,
compare the first signal with the second signal,
identify an application that is being operated by the electronic device, and
based on a result of the comparing and the application:
select the first speaker of the electronic device as an available speaker and the second microphone of the external electronic device as an available microphone, or
select the second speaker of the external electronic device as the available speaker and the first microphone of the electronic device as the available microphone.

* * * * *